United States Patent
Baldwin et al.

(10) Patent No.: US 9,307,888 B2
(45) Date of Patent: Apr. 12, 2016

(54) SYSTEM FOR CHARGING A POWER SUPPLY IN A CLOSURE ELEMENT OF A HOUSEHOLD APPLIANCE

(71) Applicant: Whirlpool Corporation, Benton Harbor, MI (US)

(72) Inventors: Mark W. Baldwin, Saint Joseph, MI (US); Marcus R. Fischer, Stevensville, MI (US); Saadat Hussain, Houston, TX (US); Justin D. McIver, Saint Joseph, MI (US); Elizabeh A. Moit, Cleveland, TN (US); Demetrius J. Schaaf, Saint Joseph, MI (US); Blayne C. Smith, Saint Joseph, MI (US); Bryan M. Topp, Baroda, MI (US); Barry E. Tuller, Stevensville, MI (US); Ameresh B. Viswanathan, Saint Joseph, MI (US); Anthony B. Welsh, Saint Joseph, MI (US); Andrew T. Middleton, Spring, TX (US)

(73) Assignee: Whirlpool Corporation, Benton Harbor, MI (US)

( * ) Notice: Subject to any disclaimer, the term of this patent is extended or adjusted under 35 U.S.C. 154(b) by 684 days.

(21) Appl. No.: 13/681,793

(22) Filed: Nov. 20, 2012

(65) Prior Publication Data
US 2013/0125938 A1    May 23, 2013

Related U.S. Application Data

(60) Provisional application No. 61/563,058, filed on Nov. 23, 2011.

(51) Int. Cl.
*A47L 15/42* (2006.01)
*A47L 15/00* (2006.01)

(52) U.S. Cl.
CPC .......... *A47L 15/4259* (2013.01); *A47L 15/0018* (2013.01); *A47L 15/4257* (2013.01); *A47L 15/4293* (2013.01)

(58) Field of Classification Search
CPC ............ A47L 11/4011; A47L 11/4002; A47L 15/4293; A47L 9/2857; A47L 15/006; A47L 15/0063
See application file for complete search history.

(56) References Cited

U.S. PATENT DOCUMENTS

| 892,187 A | 6/1908 | Schriefer |
| 909,547 A | 1/1909 | Clark |

(Continued)

FOREIGN PATENT DOCUMENTS

| CN | 2327965 Y | 7/1999 |
| DE | 3922839 A1 | 1/1991 |

(Continued)

OTHER PUBLICATIONS

European Search Report for Counterpart EP12194115.7, Mar. 28, 2013.

*Primary Examiner* — David Cormier
*Assistant Examiner* — Irina Graf

(57) ABSTRACT

A dishwasher includes an open-face tub and a closure element selectively closing the open face of the tub and housing a user interface powered by a rechargeable power supply, such as a battery, operatively coupled to a power charger. In one embodiment, the user interface is not removable from the closure element, and the power charger may be remote from the closure element to selectively provide power to the rechargeable power supply. In another embodiment, the closure element may include a first door and a second door, with each door having an inductive part for formation of an inductive coupling to charge the rechargeable power supply when the doors are in juxtaposition.

12 Claims, 29 Drawing Sheets

(56) References Cited

U.S. PATENT DOCUMENTS

| | | |
|---|---|---|
| 2,214,759 A | 9/1940 | Bosch, Jr. |
| 2,815,018 A | 12/1957 | Collins |
| 3,131,981 A | 5/1964 | Scott et al. |
| 3,143,638 A | 8/1964 | Scott |
| 3,176,118 A | 3/1965 | Scott |
| 3,430,638 A | 3/1969 | Brollo |
| 3,498,285 A | 3/1970 | McArthur, Jr. et al. |
| 4,149,518 A | 4/1979 | Schmidt et al. |
| 4,271,892 A | 6/1981 | Brusseau et al. |
| 4,875,745 A | 10/1989 | Trulaske |
| 5,470,142 A | 11/1995 | Sargeant et al. |
| 5,618,458 A | 4/1997 | Thomas |
| 5,651,380 A | 7/1997 | Sargeant et al. |
| 5,651,382 A | 7/1997 | Sargeant et al. |
| 5,709,237 A | 1/1998 | Sargeant et al. |
| 5,743,281 A | 4/1998 | Sargeant et al. |
| 5,755,244 A | 5/1998 | Sargeant et al. |
| 6,189,551 B1 | 2/2001 | Sargeant et al. |
| 6,244,277 B1 | 6/2001 | Maunsell |
| 6,294,767 B1 | 9/2001 | Sargeant et al. |
| 6,398,495 B1 | 6/2002 | Kazianus |
| 6,409,517 B2 | 6/2002 | Malnati |
| 6,447,081 B1 | 9/2002 | Sargeant et al. |
| 6,517,365 B1 | 2/2003 | Bungo et al. |
| 6,996,967 B2 | 2/2006 | Kobayashi |
| 7,640,866 B1 | 1/2010 | Schermerhorn |
| 7,775,223 B2 | 8/2010 | Gunnerson et al. |
| 8,106,539 B2 | 1/2012 | Schatz et al. |
| 2002/0088502 A1 * | 7/2002 | Van Rompuy ........ A47L 15/006 141/1 |
| 2002/0171335 A1 | 11/2002 | Held |
| 2006/0087207 A1 | 4/2006 | Oh et al. |
| 2006/0087208 A1 | 4/2006 | Oh et al. |
| 2008/0315735 A1 | 12/2008 | Fabbro et al. |
| 2009/0118848 A1 | 5/2009 | Santinato et al. |
| 2009/0301312 A1 | 12/2009 | Iwamoto et al. |
| 2011/0050065 A1 | 3/2011 | Lee et al. |
| 2011/0057460 A1 | 3/2011 | Onofrio |
| 2011/0121660 A1 | 5/2011 | Azancot et al. |
| 2011/0146333 A1 | 6/2011 | Koo et al. |
| 2011/0181163 A1 | 7/2011 | Han et al. |
| 2012/0161594 A1 | 6/2012 | Kim et al. |
| 2012/0187811 A1 | 7/2012 | Kim et al. |
| 2012/0217851 A1 | 8/2012 | Bae et al. |

FOREIGN PATENT DOCUMENTS

| | | | |
|---|---|---|---|
| EP | 1776914 A1 | 4/2007 | |
| EP | 2186463 A1 * | 5/2010 | ............ A47L 9/2831 |
| EP | 2324751 A1 | 5/2011 | |
| FR | 2730912 A1 | 8/1996 | |
| JP | 10211037 A | 8/1998 | |
| JP | 11178770 A | 7/1999 | |
| JP | 2000326853 A | 11/2000 | |
| JP | 2002034686 A | 2/2002 | |
| JP | 2002066189 A | 3/2002 | |
| JP | 2002238679 A | 8/2002 | |
| JP | 2003079457 A | 3/2003 | |
| JP | 3451218 B2 | 9/2003 | |
| JP | 2004040713 A | 2/2004 | |
| JP | 2005110901 A | 4/2005 | |
| JP | 2005270476 A2 | 10/2005 | |
| JP | 2006219250 A | 8/2006 | |
| JP | 2007044550 A | 2/2007 | |
| JP | 2008092985 A | 4/2008 | |
| JP | 4515126 B2 | 7/2010 | |
| JP | 2010142319 A | 7/2010 | |
| JP | 2010146780 A | 7/2010 | |
| JP | 4570975 B2 | 10/2010 | |
| JP | 4655380 B2 | 3/2011 | |
| JP | 4789375 B2 | 10/2011 | |
| KR | 1020100106686 A | 10/2010 | |
| KR | 1020110072372 A | 6/2011 | |
| WO | 2009086888 A1 | 7/2009 | |
| WO | 2009123530 A1 | 8/2009 | |

* cited by examiner

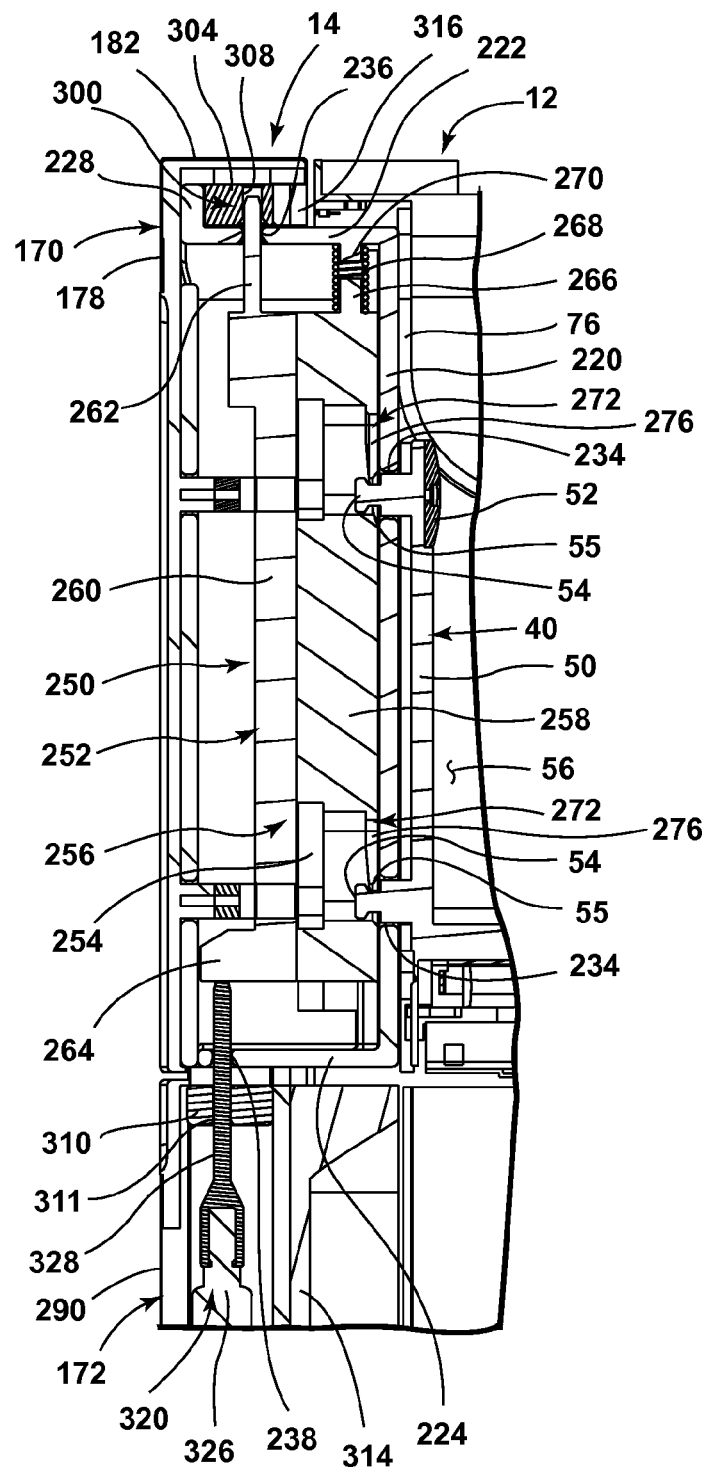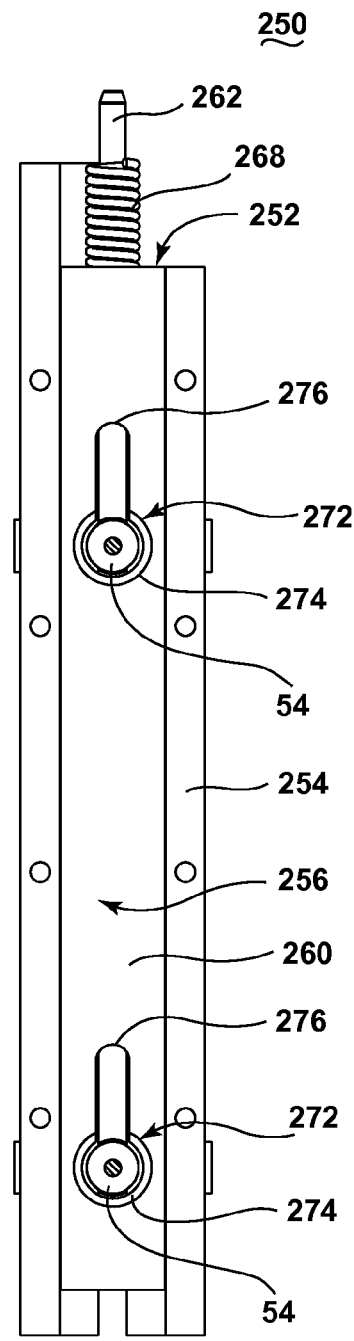
Fig. 14A
Fig. 14B

SYSTEM FOR CHARGING A POWER SUPPLY IN A CLOSURE ELEMENT OF A HOUSEHOLD APPLIANCE

CROSS-REFERENCE TO RELATED APPLICATIONS

This application claims the benefit of U.S. patent application No. 61/563,058, filed Nov. 23, 2011.

BACKGROUND

Contemporary automatic household dishwashers may have either a single compartment or multiple compartments for receiving soiled utensils to be treated. Typically, dishwashers with a single compartment have a single tub at least partially defining a treating chamber and a hinged door that provides access to the treating chamber. Multiple racks slidably mounted to the tub and movable relative to the treating chamber support the utensils. In multiple compartment dishwashers, the compartments are often in the form of multiple, separate drawers or pull-out compartments. Each compartment can include a slidable tub at least partially defining a treating chamber. One or more racks in the multiple compartment dishwashers may be disposed inside and moveable with its respective treating chamber to support the utensils in the treating chamber.

SUMMARY

A dishwasher according to one embodiment of the invention configured to execute at least one automatic cycle of operation for treating utensils comprises a tub at least partially defining a treating chamber with an open face for receiving utensils for treatment, a closure element movable between opened and closed conditions to selectively close the open face, a user interface non-removably mounted to the closure element, a rechargeable power supply operably coupled to the user interface, and a power charger remote from the closure element selectively providing power to the rechargeable power supply.

A household appliance according to another embodiment of the invention comprises a cabinet having an open face, a first door movable relative to the cabinet to provide selective access to at least a first portion of the open face, a second door movable relative to the cabinet to provide selective access to at least a second portion of the open face, which is different than the first portion, and the second door having at least one electrical component powered by a battery, and a power charger having a first inductive part mounted to the first door and operatively coupled to an external power source and a second inductive part mounted to the second door and operatively coupled to the battery such that when the first and second doors are in juxtaposition, the first and second inductive parts form an inductive coupling to charge the battery with electricity from the external power source.

BRIEF DESCRIPTION OF THE DRAWINGS

In the drawings:

FIG. 14A is a sectional view similar to FIG. 9 also showing a portion of the lower door and the drawer of the dishwasher, wherein the door is in a door mode.

FIG. 14B is a rear view of a transformation assembly from FIG. 9 showing the position of a mounting pin from the drawer when the door is in the door mode.

DESCRIPTION OF EMBODIMENTS OF THE INVENTION

Figure 1:
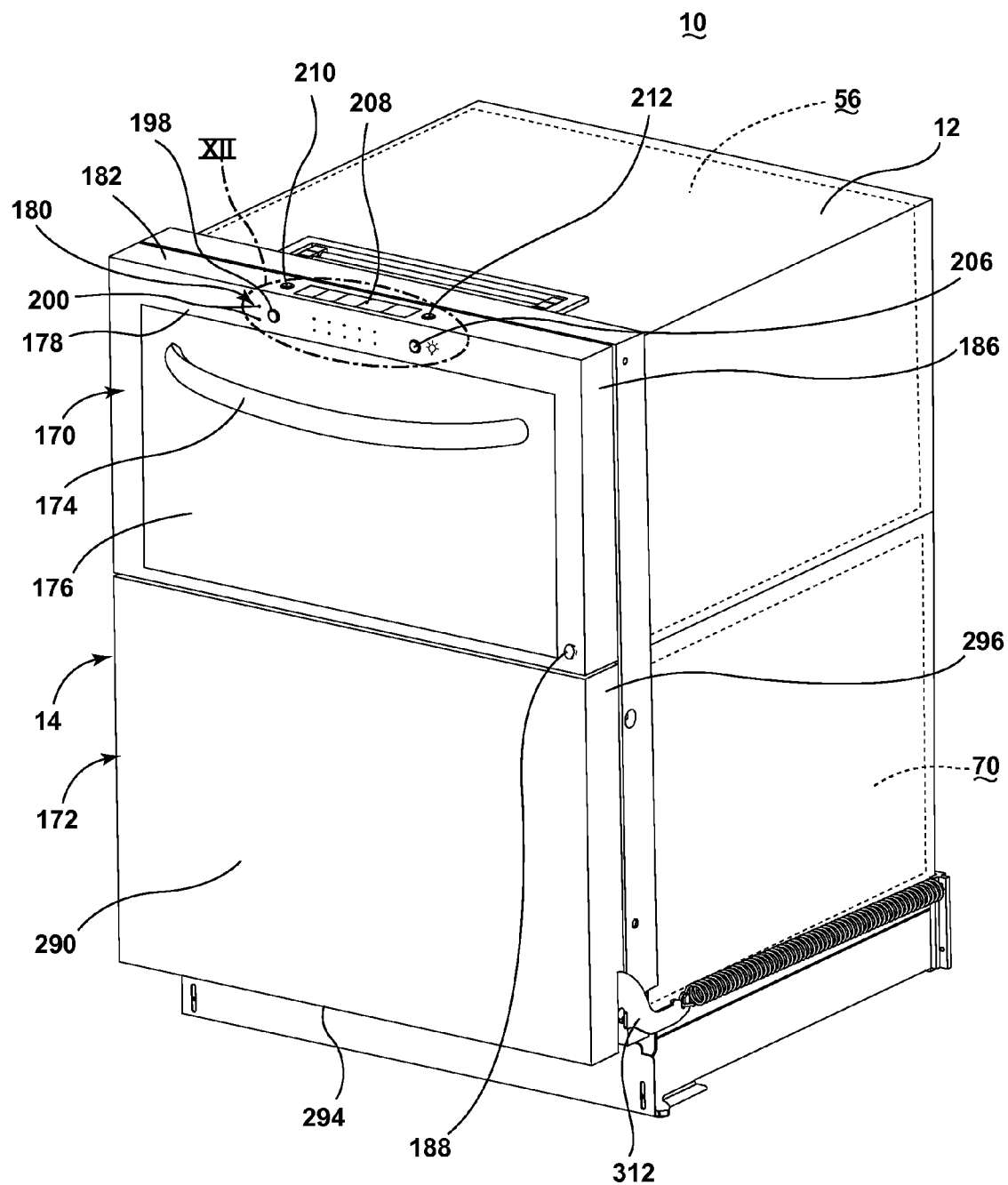
FIG. 1 is a perspective view of a dishwasher according to one embodiment.

FIG. 1 is a perspective view of a convertible multi-compartment dishwasher 10 according to an embodiment of the invention. Although the actual dishwasher 10 into which the embodiments of the invention may be incorporated may vary, the invention is shown in connection with the dishwasher 10 for illustrative purposes. The dishwasher 10 includes a chassis 12 and a closure element, illustrated in the form of a door 14 mounted to the chassis 12. The chassis 12 may be a cabinet or a frame, with or without exterior panels. Built-in dishwashers typically have only a frame without panels, whereas stand-alone dishwashers have a frame with decorative panels covering the frame.

Figure 2:
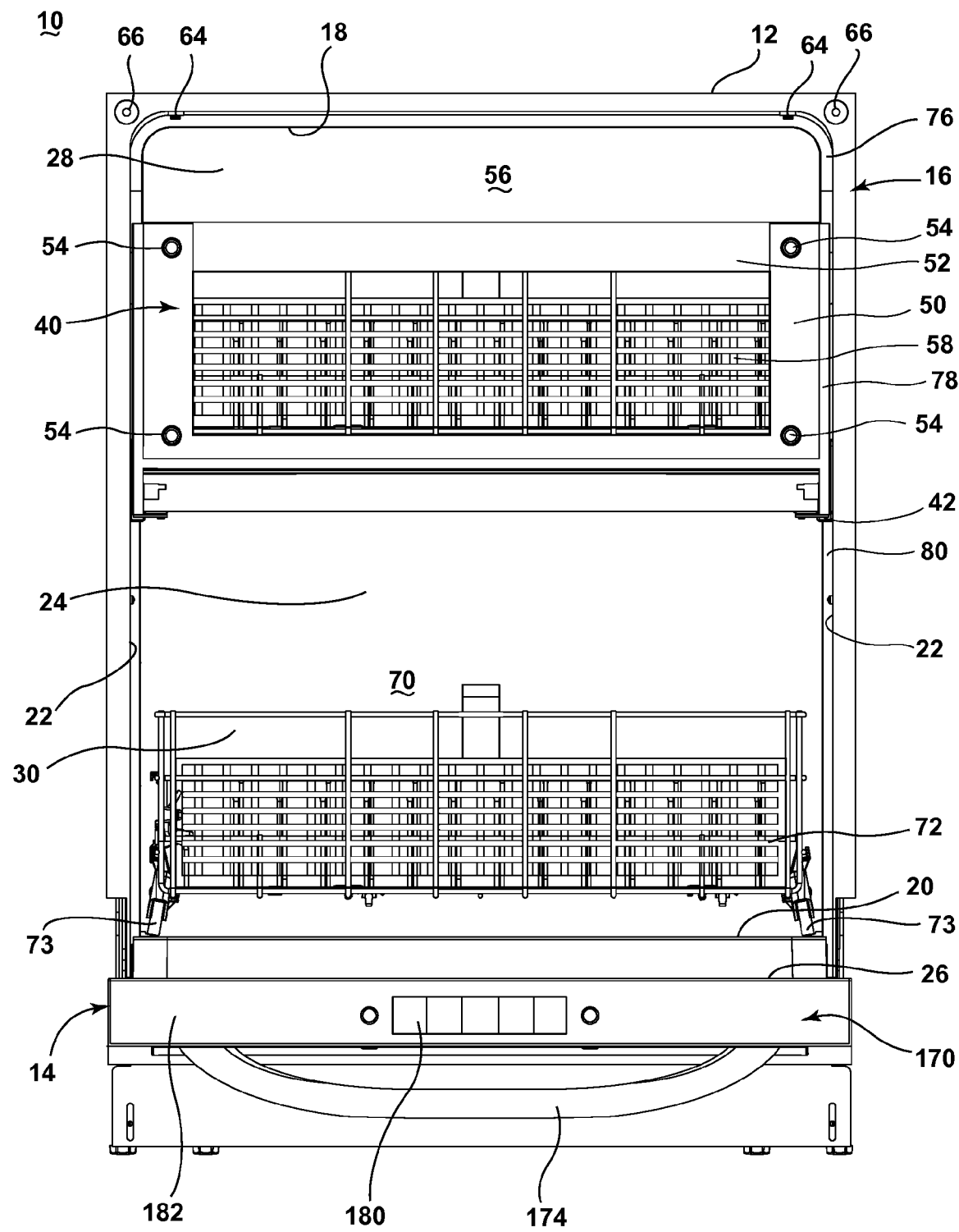
FIG. 2 is a front view of the dishwasher of FIG. 1 with a door in an open position showing an upper treatment chamber with a slidable drawer carrying a utensil rack and a lower treatment chamber with a slidable utensil rack.

Referring now to FIG. 2, which is a front view of the dishwasher 10 with the door 14 in an open position, the dishwasher 10 may comprise an open-face tub 16 having opposing top and bottom walls 18, 20, opposing side walls 22, a rear wall 24, and a front wall 26 that collectively define an interior. The tub front wall 26 may be a moveable element provided by the door 14, which may be moveably mounted to the chassis 12 for selective access to the tub 16 through the open face for loading and unloading utensils or other washable items. In particular, the tub top and bottom walls 18, 20 and opposing side walls 22 define a front opening that provides access to the interior of the tub 16, and the door 14 may selectively close the opening for selective access to the interior of the tub 16.

The interior of the tub 16 may include any number of multiple compartments, and the illustrated embodiment features two compartments, an upper compartment 28 and a lower compartment 30. The upper and lower compartments 28, 30 are illustrated as having differing size, with the upper compartment 28 being smaller than the lower compartment 30; however, the compartments 28, 30 may be of the same size.

Figure 3:
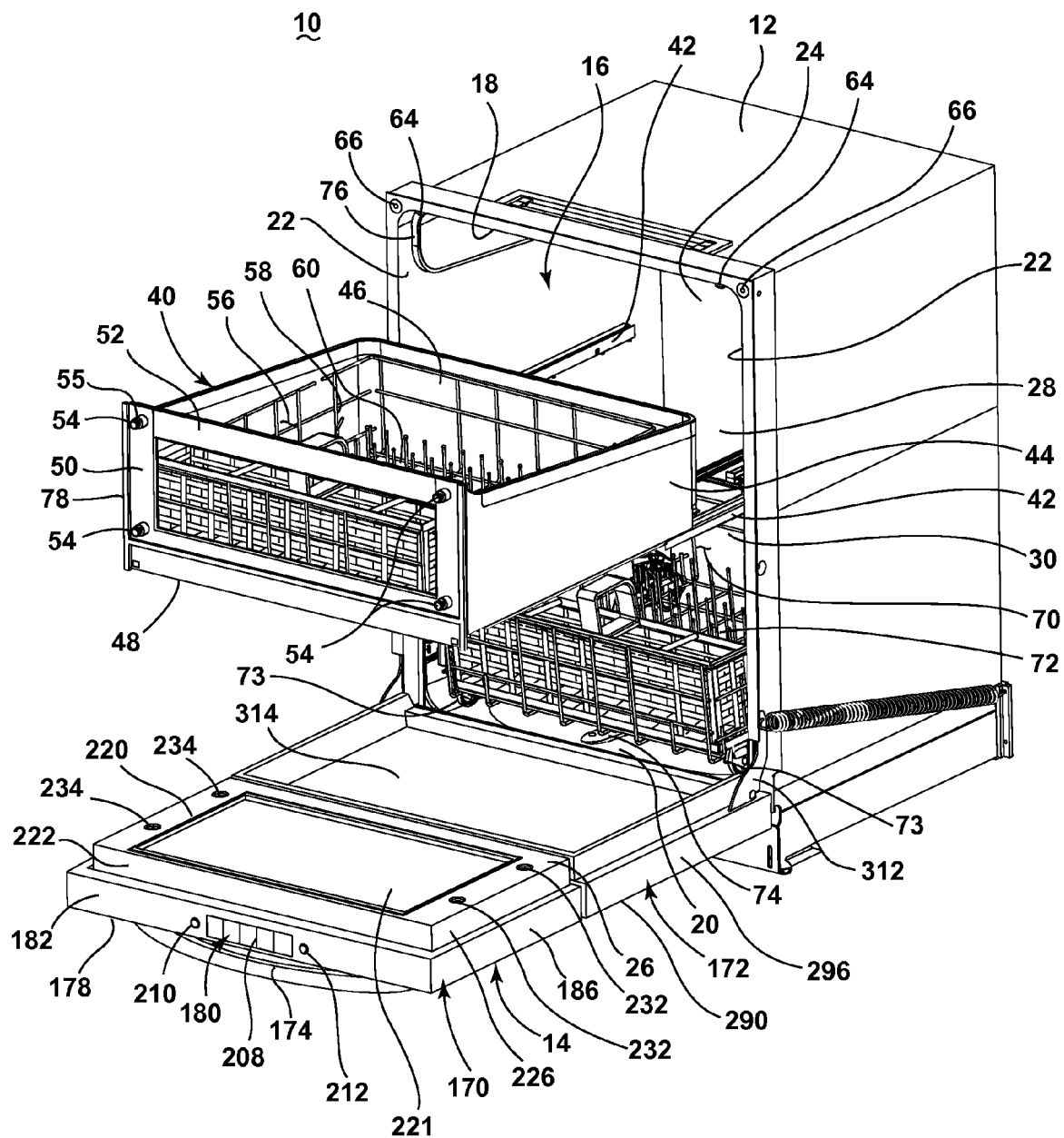
FIG. 3 is a perspective view of the dishwasher of FIG. 1 with the drawer in an extended position and the utensil rack in a retracted position.

As shown in the perspective view of the dishwasher in FIG. 3, the upper compartment 28 may be at least partially formed by a drawer 40 slidably mounted to the side walls 22 by slide rails 42. The slide rails 42 may be well-known, conventional drawer slides; alternatively, the drawer 40 may be mounted to the side walls 22 by other suitable extendible support guides or attachment devices. The drawer 40 includes opposing side walls 44 joined by a rear wall 46, a bottom wall 48, and a front frame 50 that supports a drawer handle 52 spanning an upper portion of the frame 50 and forwardly projecting mounting pins 54 having reduced diameter notches 55 and positioned, by way of example, in vertically aligned pairs on opposite sides of the frame 50. The drawer handle 52 facilitates movement of the drawer 40 between an extended position, as shown in FIG. 3, and a retracted position, illustrated in FIG. 4. Collectively, the drawer 40 and the portion of the tub 16 in the upper compartment 28 form an upper tub defining an upper treatment chamber 56. The drawer 40 may be provided with a utensil rack 58 for supporting various objects, such as utensils and the like, to be exposed to a treating operation in the upper treatment chamber 56.

Further, a spray system is provided for spraying liquid or a mixture of gas and liquid, including foams, hereinafter collectively referred to as liquid, within the upper treatment chamber 56. The spray system may include a sprayer of some type for spraying liquid in the treatment chamber. As illustrated, the sprayer is a spray assembly 60 that may be located in the upper treatment chamber 56 to function as a fluid inlet for the upper treatment chamber 56. The spray assembly 60 may comprise a traditional spray arm located below the rack 58, as shown for illustrative purposes in the figures. The spray assembly 60 is configured to rotate in the upper treatment chamber 56 and generate a spray of liquid in a generally upward direction, over at least a portion of the upper treatment chamber 56, typically directed to treat utensils located in the racks 58. Alternatively or additionally, the spray assembly 60 may include other types of spray assemblies, including stationary sprayers, zone sprayers, individual spray nozzles, and the like, located at any suitable location, such as on the tub top wall 18, side walls 22, rear wall 24, and the utensil rack 58 to provide treatment fluid to the upper treatment chamber 56. The type, number, and location of the spray assembly 60 are not germane to the present invention. Optionally, the bottom wall 48 of the drawer 40 may be sloped to function as a sump or fluid outlet to drain treatment fluid from the upper treatment chamber 56.

Figure 4:
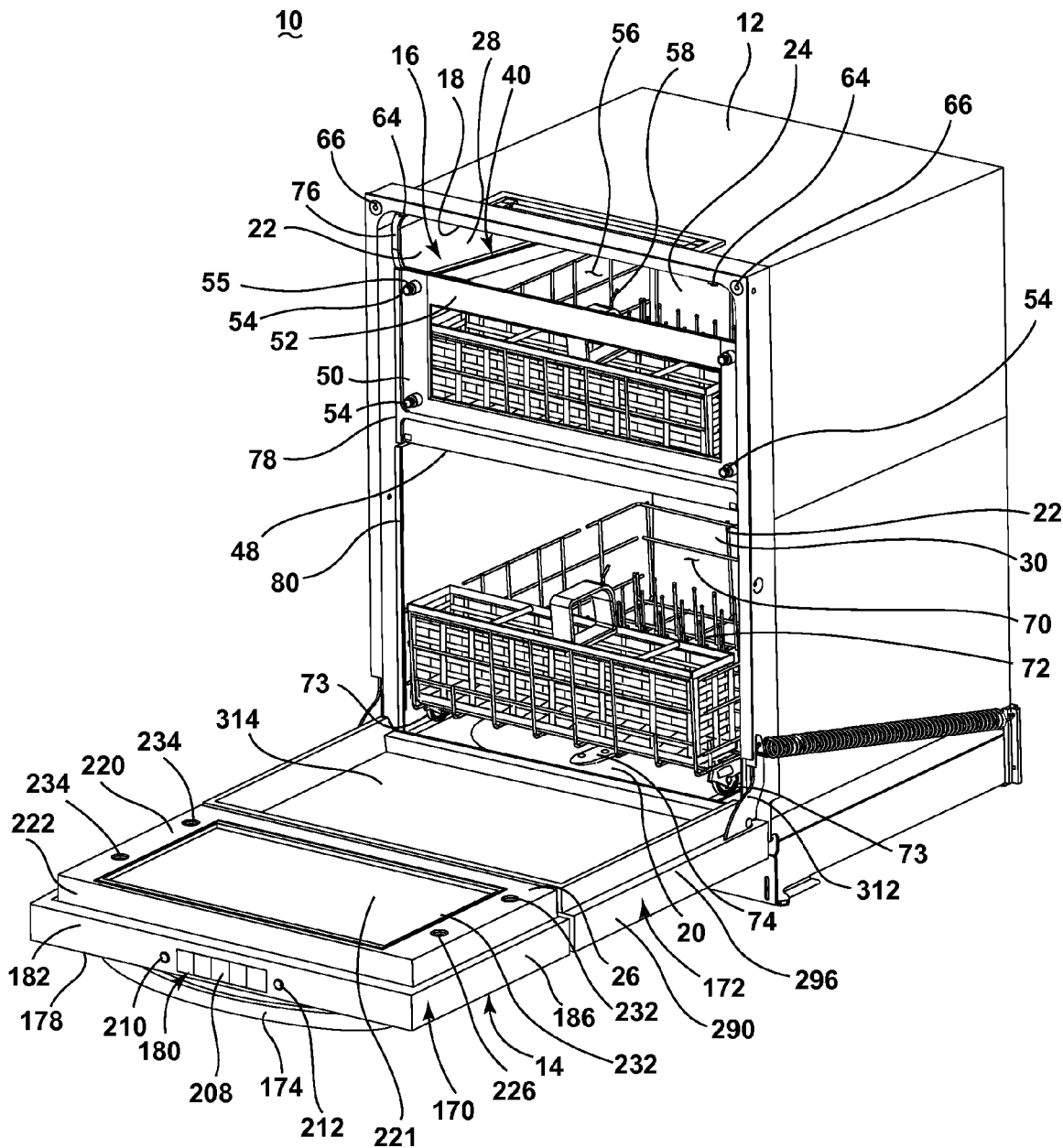
FIG. 4 is a perspective view similar to FIG. 3 with both the drawer and utensil rack in retracted positions.

With continued reference to FIG. 4, the lower compartment 30 may include a lower tub collectively formed by the underside of the drawer 40 and the portion of the tub 16 below the drawer 40 to define a lower treatment chamber 70. Alternatively, the dishwasher 10 may include a partition, such as a wall, below the drawer 40 to physically separate the tub 16 into the upper and lower compartments 28, 30 rather than having the drawer 40 form the partition. A utensil rack 72 for supporting various objects, such as utensils and the like, to be exposed to a treating operation in the lower treatment chamber 70, and the rack 72 may have wheels 73 on its lower side such that the rack 72 may roll on the door 14 between the retracted and extended positions. Alternatively, the rack 72 may be slidably mounted to the side walls 22 by slide rails. The slide rails may be well-known, conventional drawer slides or other suitable extendible support guides or attachment devices. The wheels 73 enable movement of the rack 72 between a retracted position, as shown in FIG. 4, and an extended position, illustrated in FIG. 5.

Figure 5:
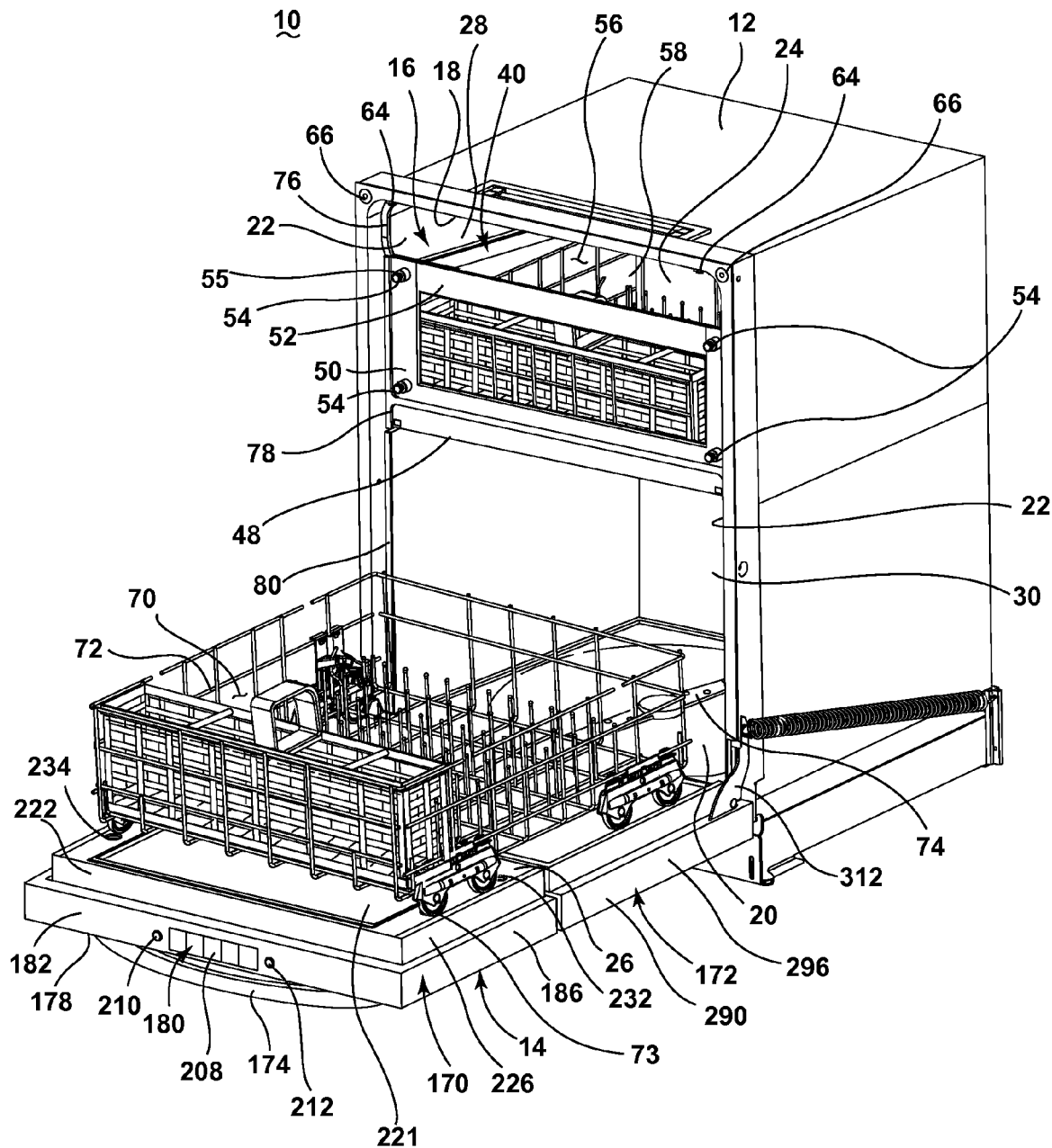
FIG. 5 is a perspective view similar to FIG. 3 with the drawer in a retracted position and the utensil rack in an extended position.

The spray system may also spray liquid within the lower treatment chamber 70. As seen in FIG. 5, the spray system may include a sprayer in the form of a spray assembly 74 located in the lower treatment chamber 70 to function as a fluid inlet for the lower treatment chamber 70. The spray assembly 74 may comprise a traditional spray arm located below the rack 72, as shown for illustrative purposes in the figures. The spray assembly 74 is configured to rotate in the lower treatment chamber 70 and generate a spray of liquid in a generally upward direction, over at least a portion of the lower treatment chamber 70, typically directed to treat utensils located in the rack 72. The spray assembly 74 may be operated independently of the spray assembly 60 for the upper treatment chamber 56. Alternatively or additionally, the spray assembly 74 may include other types of spray assemblies, including stationary sprayers, zone sprayers, individual spray nozzles, and the like, located at any suitable location, such as on the tub side walls 22 and rear wall 24 or on the utensil rack 72, to provide treatment fluid to the lower treatment chamber 70. The type, number, and location of the spray assembly 74 are not germane to the present invention. Optionally, the bottom wall 20 of the tub 16 may be sloped to function as a sump or fluid outlet to drain treatment fluid from the lower treatment chamber 70.

A sealing system, which is illustrated in the form of one or more seals, may be located in the dishwasher 10 to prevent fluid leakage between the upper and lower treatment chambers 56, 70 and between the door 14 and the tub 16 outside the dishwasher 10. For example, an upper seal 76 may be present around the front perimeter of the tub 16 above the drawer 40 and along the upper edge of the drawer side walls 44 and the drawer rear wall 46, and a drawer front seal 78 may be placed on the side edges and across the lower edge of the drawer front frame 50. Further, a lower seal 80 (FIG. 2) may be positioned around the front perimeter of the tub 16 below the drawer 40. The portion of the upper seal 76 around the front perimeter of the tub 16, the drawer front seal 78, and the lower seal 80 abut and seal with the door 14 when the door 14 is closed to prevent fluid leakage outside the dishwasher 10. The remaining portions of the upper seal 76 fluidly seal the upper treatment chamber 56 from the lower treatment chamber 70. While the sealing system of the present embodiment is formed of multiple seals, it is to be understood that the sealing system may have any suitable number of seals, including a single seal, or differing types of seals to accomplish the sealing function, depending on the structure of the dishwasher 10 into which the sealing system is incorporated. For example, the lower seal 80 may include a portion that extends horizontally across the opening of the tub 16 to form a seal for the upper limit of the lower compartment 30. In such an embodiment, the horizontal portion of the lower seal 80 could be located along the aforementioned alternative partition separating the upper and lower compartments 28, 30.

Further, a closing system, which is illustrated as having one or more sensors and latches on the drawer 40 and the tub 16, may interact with corresponding components on the door 14 to detect the position of various portions of the door 14 and to secure the door 14 in a locked condition, respectively. A pair of lower door positional sensors 64 are shown as projecting downwardly from the top wall 18 of the tub 16, particularly near the front edge of the top wall 18. The lower door positional sensors 64 interact with the door 14 to detect the position of a lower portion of the door 14 and may be any suitable type of sensor, such as a limit switch, for example. Further, the tub 16 may carry a locking device in the form of a pair of latches 66 on the periphery of the tub 16 for securing the lower portion of the door 14 in a locked condition. The latches 66 may be any suitable type of latches and are illustrated by example as electromagnets that, when activated, exert a magnetic force on a part of the door 14 made of a magnetic material, such as metal. Interaction between the upper and lower portions of the door 14 and the various sensors 64 and the latches 66 will be discussed in further detail below.

Figure 6:
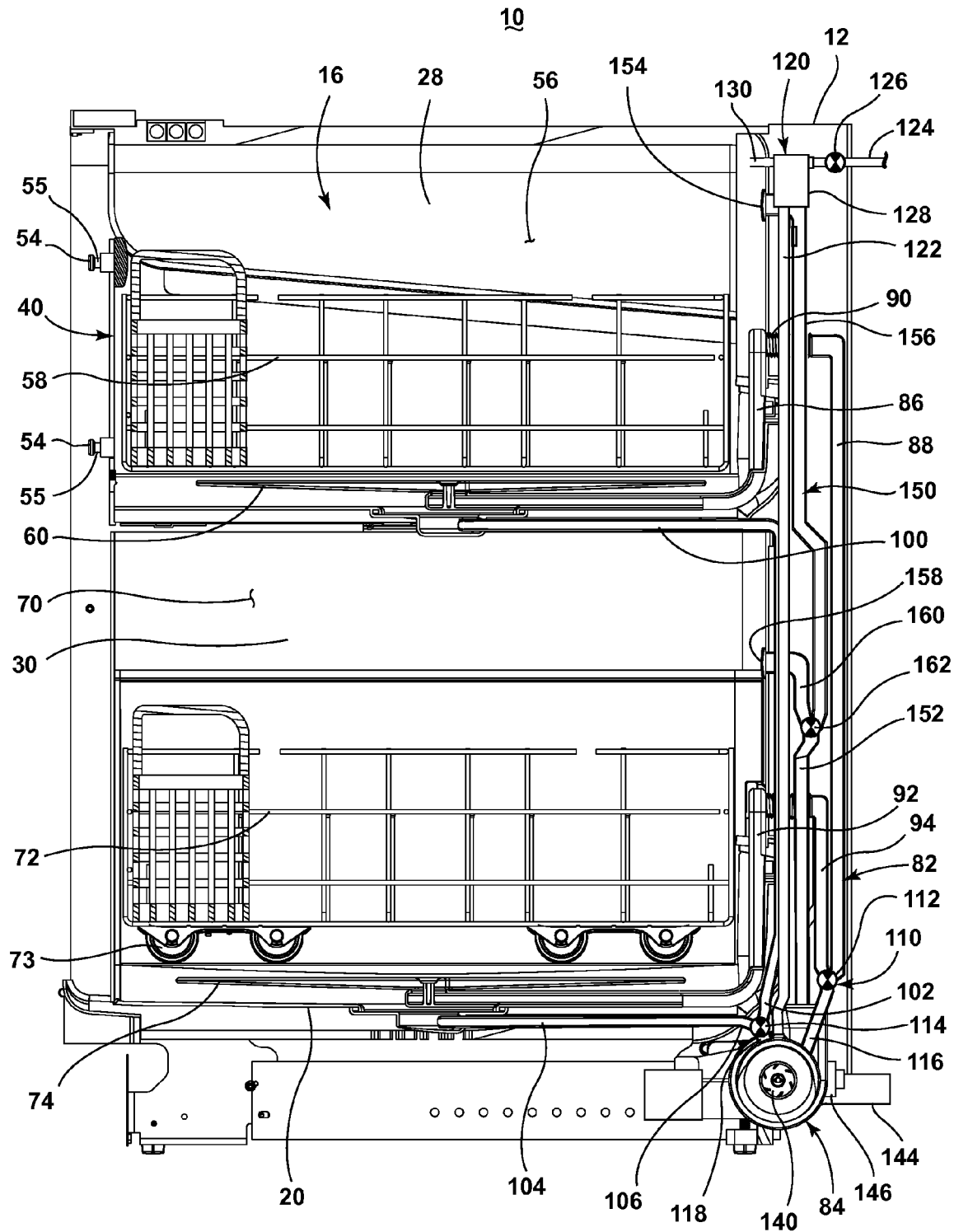
FIG. 6 is a schematic side view of a portion of the dishwasher of FIG. 1 illustrating a liquid circulation system, a liquid supply system, and an air supply system.

The dishwasher 10 may further include a liquid circulation system 82, which may include a pump and filter unit 84, as shown in the schematic view of the dishwasher 10 in FIG. 6, for selectively supplying, recirculating, and draining liquid from the upper and lower treatment chambers 56, 70. The liquid circulation system 82 may be fluidly coupled to the spray system having the upper spray assembly 60 and the lower spray assembly 74 described above. Further, the liquid circulation system 82 includes an upper spray conduit 86 provided in the drawer 40 and coupled to the upper spray assembly 60 and to an upper supply conduit 88 for supplying liquid to the spray assembly 60. To accommodate sliding movement of the drawer 40 and the upper spray assembly 60 that moves with the drawer 40, an extendable tube 90, such as a corrugated tube, may be fluidly coupled between the upper spray conduit 86 and the upper supply conduit 88. Alternatively, other types of couplings may be employed, such as a docking type connection, telescoping conduits, or other types of moveable conduits. For the lower treatment chamber 70, a lower spray conduit 92 provided in the lower treatment chamber 70 and coupled to the lower spray assembly 74 and to a lower supply conduit 94 may supply liquid to the lower spray assembly 74.

Similar conduits may be present for fluidly coupling the upper and lower sumps to the pump and filter unit 84. An upper return conduit 100 extending along the underside of the drawer 40 and an upper outlet conduit 102 fluidly couple the upper sump formed by the drawer bottom wall 48 with the pump and filter unit 84. To accommodate sliding movement of the drawer 40 and the upper sump that moves with the drawer 40, the upper return conduit 100 may selectively uncouple and recouple with the upper sump. Alternatively, the upper return conduit 100 may be configured such that the upper return conduit 100 remains coupled with the upper sump during movement of the drawer 40. For the lower treatment chamber 70, a lower return conduit 104 extending below the tub 16 and a lower outlet conduit 106 fluidly couple the lower sump formed by the tub bottom wall 20 with the pump and filter unit 84.

The liquid circulation system 82 may further comprise a liquid diverter system 110 having tub inlet and outlet diverters 112, 114 to selectively control the liquid movement within and between the lower and upper treatment chambers 56, 70. The tub inlet diverter 112 has an inlet fluidly coupled to a pump outlet conduit 116 of the pump and filter unit 84 and a pair of outlets fluidly coupled to the upper and lower supply conduits 88, 94. Correspondingly, the pump and filter unit 84 may supply liquid to the upper and lower treatment chambers 56, 70 through the pump outlet conduit 116, the tub inlet diverter 112, and the respective upper and lower supply conduits 88, 94, upper and lower spray conduits 86, 92, and upper and lower spray assemblies 60, 74. The tub outlet diverter 114 has a pair of inlets fluidly coupled to the upper and lower outlet conduits 102, 106 and an outlet fluidly coupled to a pump inlet conduit 118 of the pump and filter unit 84. Correspondingly, the pump and filter unit 84 may receive liquid drained from the upper and lower treatment chambers 56, 70 through the respective upper and lower sumps, upper and lower sump conduits 100, 104, upper and lower outlet conduits 102, 106, the tub outlet diverter 114, and the pump inlet conduit 118. The tub inlet and outlet diverters 112, 114 may be valve type diverters or other types of diverters capable of diverting all or some of the liquid passing therethrough.

With continued reference to FIG. 6, the dishwasher 10 may also include a liquid supply system 120 for providing liquid to the pump and filter unit 84, which selectively supplies the liquid to either or both of the upper and lower treatment chambers 56, 70 through the liquid circulation system 82. The liquid supply system 120 may include a liquid supply conduit 122 extending from a liquid source 124, such as a household water supply, to the pump and filter unit 84, and a supply valve 126 may control flow of the liquid from the liquid source 124 to the liquid supply conduit 122 and the pump and filter unit 84. A siphon break or reservoir 128 with an overflow conduit 130 may be located along the liquid supply conduit 122 to aid in supplying the liquid from the liquid source 124 to the pump and filter unit 84. Alternatively, the liquid supply system 120 may employ separate liquid supplies for the upper and lower treatment chambers 56, 70.

Figure 7:
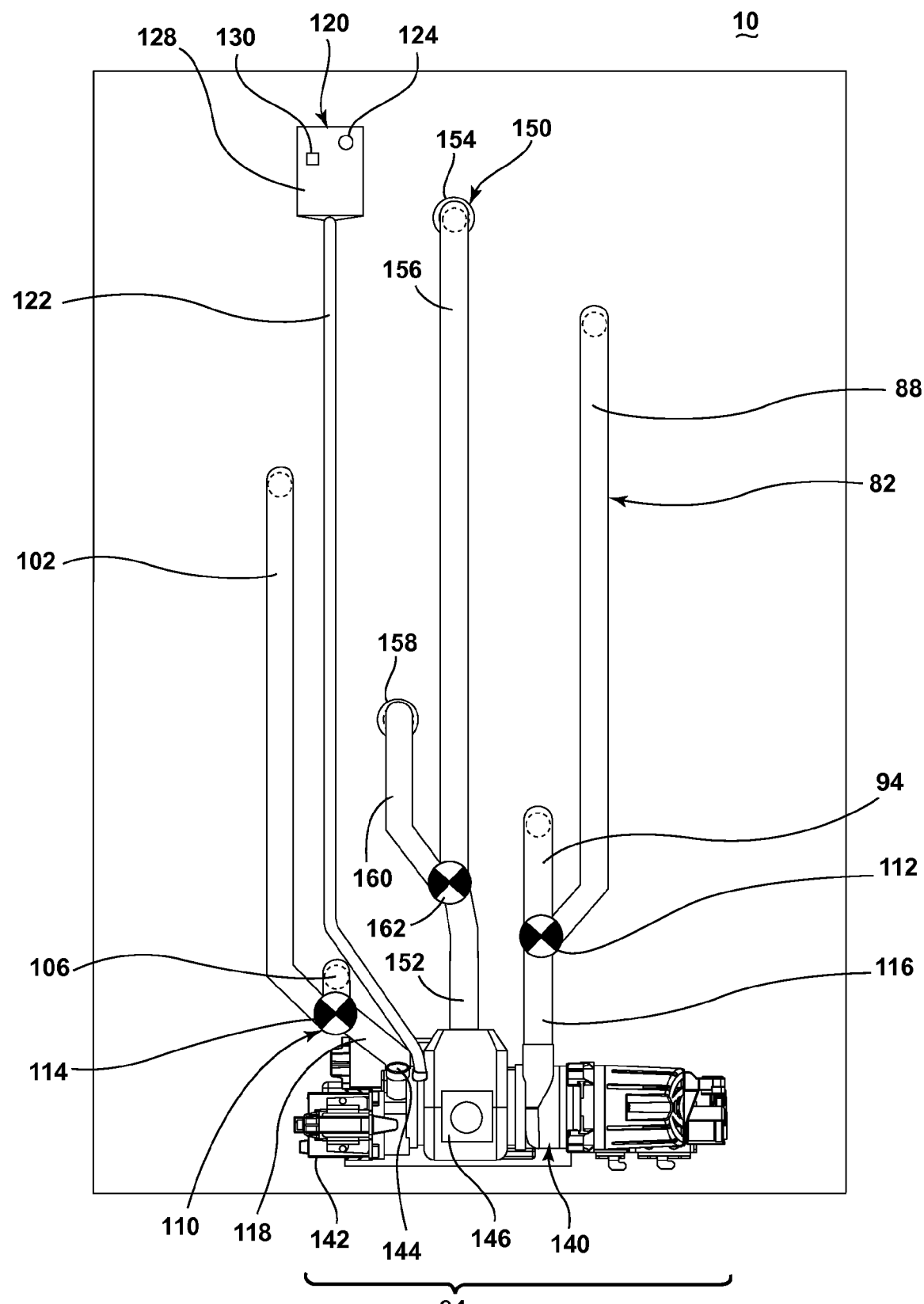
FIG. 7 is a schematic rear view of a portion of the dishwasher of FIG. 1 illustrating components of the liquid circulation system, the liquid supply system, and the air supply system.

Referring now to the schematic view of the dishwasher 10 in FIG. 7, the pump and filter unit 84 may be a single assembly incorporating several devices, such as a supply and recirculation pump 140 for pumping liquid from the liquid supply conduit 122 and/or the pump inlet conduit 118 to the pump outlet conduit 116, a drain pump 142 for pumping liquid from the pump inlet conduit 118 to a household drain conduit 144, a liquid filter (not shown) to filter the liquid prior to being supplied to the pump outlet conduit 116, a heater (not shown) for heating the liquid prior to being supplied to the pump outlet conduit 116, and a fan or blower 146. Further details of exemplary pump and filter units may be found in U.S. patent application Ser. No. 12/643,394, filed Dec. 21, 2009, U.S. patent application Ser. No. 12/910,203, filed Oct. 22, 2010, U.S. patent application Ser. No. 12/947,317, filed Nov. 16, 2010, U.S. patent application Ser. No. 12/959,483, filed Dec. 3, 2010, U.S. patent application Ser. No. 12/949,687, filed Dec. 3, 2010, U.S. patent application Ser. No. 12/959,507, filed Dec. 3, 2010, U.S. patent application Ser. No. 12/959,673, filed Dec. 3, 2010, U.S. patent application Ser. No. 12/966,420, filed Dec. 13, 2010, and related applications, which are incorporated herein by reference in their entirety. The '673 application further includes additional details of an exemplary liquid circulation system, including an exemplary liquid diverter system, and an exemplary liquid supply system.

The dishwasher 10 may further include an air supply system 150 that comprises the blower 146 of the pump and filter unit 84, along with a blower outlet conduit 152 in fluid communication with an upper inlet vent 154 in the upper treatment chamber 56 through an upper air conduit 156 and a lower inlet vent 158 in the lower treatment chamber 70 through a lower air conduit 160. An air diverter 162 may selectively direct air from the blower outlet conduit 152 to one of the upper and lower air conduits 156, 160 to thereby selectively deliver air to the upper and lower treatment chambers 56, 70, respectively. Optionally, the heater of the pump and filter unit 84 may heat the air prior to delivery to the upper and lower treatment chambers 56, 70. Further details of an exemplary air supply system may be found in the aforementioned and incorporated '673 application.

The described and illustrated liquid circulation system 82, liquid supply system 120, and air supply system 150, along with the pump and filter unit 84 are provided for exemplary purposes. Any suitable systems capable of supplying, delivering, recirculating, and draining liquid and any suitable system for supplying and delivering air may be employed with the dishwasher 10.

Referring back to FIG. 1, the door 14 of the dishwasher 10 may be capable of transforming between a drawer mode (i.e., partial door mode) and a door mode (i.e., full door mode) for accessing selective treatment chambers inside the dishwasher 10. The door 14 may have a first part, illustrated as an upper door 170, and a second part, illustrated as lower door 172, to facilitate transformation between these modes. When the dishwasher 10 is in drawer mode, the user may move or open only the upper door 170 with a sliding movement for access only to the upper treatment chamber 56. Conversely, in the door mode, the user may move or open both the upper and lower doors 170, 172 as a single, full door with a pivoting movement to access both the upper and lower treatment chambers 56, 70. The upper and lower treatment chambers 56, 70 are shown schematically in phantom in FIG. 1, the boundaries of which are not intended to limit the invention.

The upper door 170 may include a handle 174 graspable by a user for moving the door 14 relative to the chassis 12. The handle 174 may be mounted to a front window 176 through which the user may view at least a portion of the interior of the dishwasher 10. The handle 174 and the front window 176 shown in the figures are for illustrative purposes only; the dishwasher 10 may include any type of handle or other device for moving the door 14 relative to the chassis 12 and may be mounted to any suitable part of the dishwasher 10, and the front window 176 can be any size or type of window or may be omitted if desired. The upper door 170 may further include a front panel 178 that surrounds and supports the front window 176 and carries a user interface 180. The front panel 178 may be generally rectangular with a top wall 182 and may wrap around a portion of the sides of the upper door 170 to form a bezel 186. A charging port 188 may be located on the upper door 170, such as on the front panel 178. The charging port 188 may be adapted for receiving a plug of a power cord (not shown) that may electrically couple with an external source of power, such as a conventional household electrical socket.

Figure 8A:
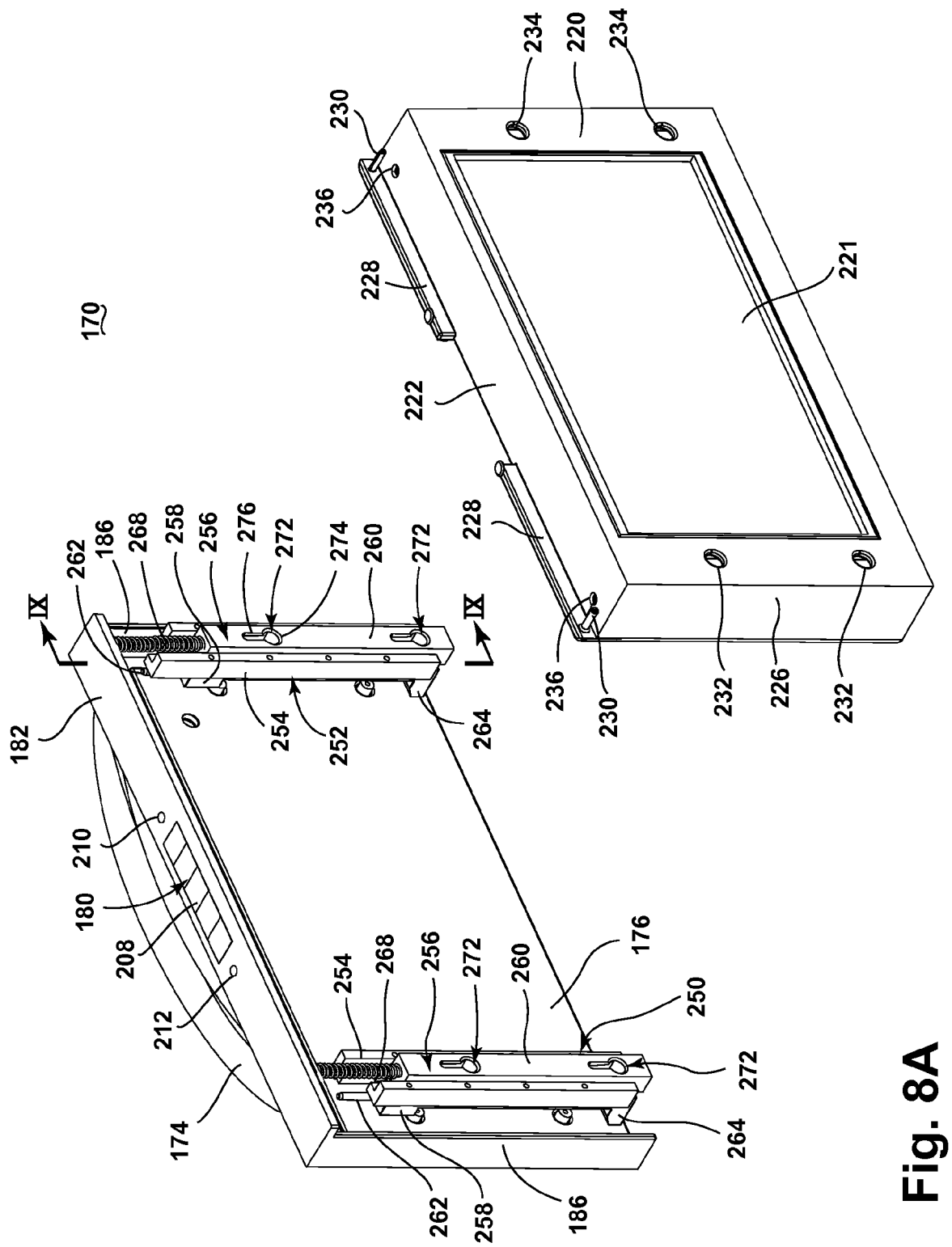
FIGS. 8A and 8B are rear exploded views of an embodiment of an upper door of the dishwasher of FIG. 1.
Figure 8B:
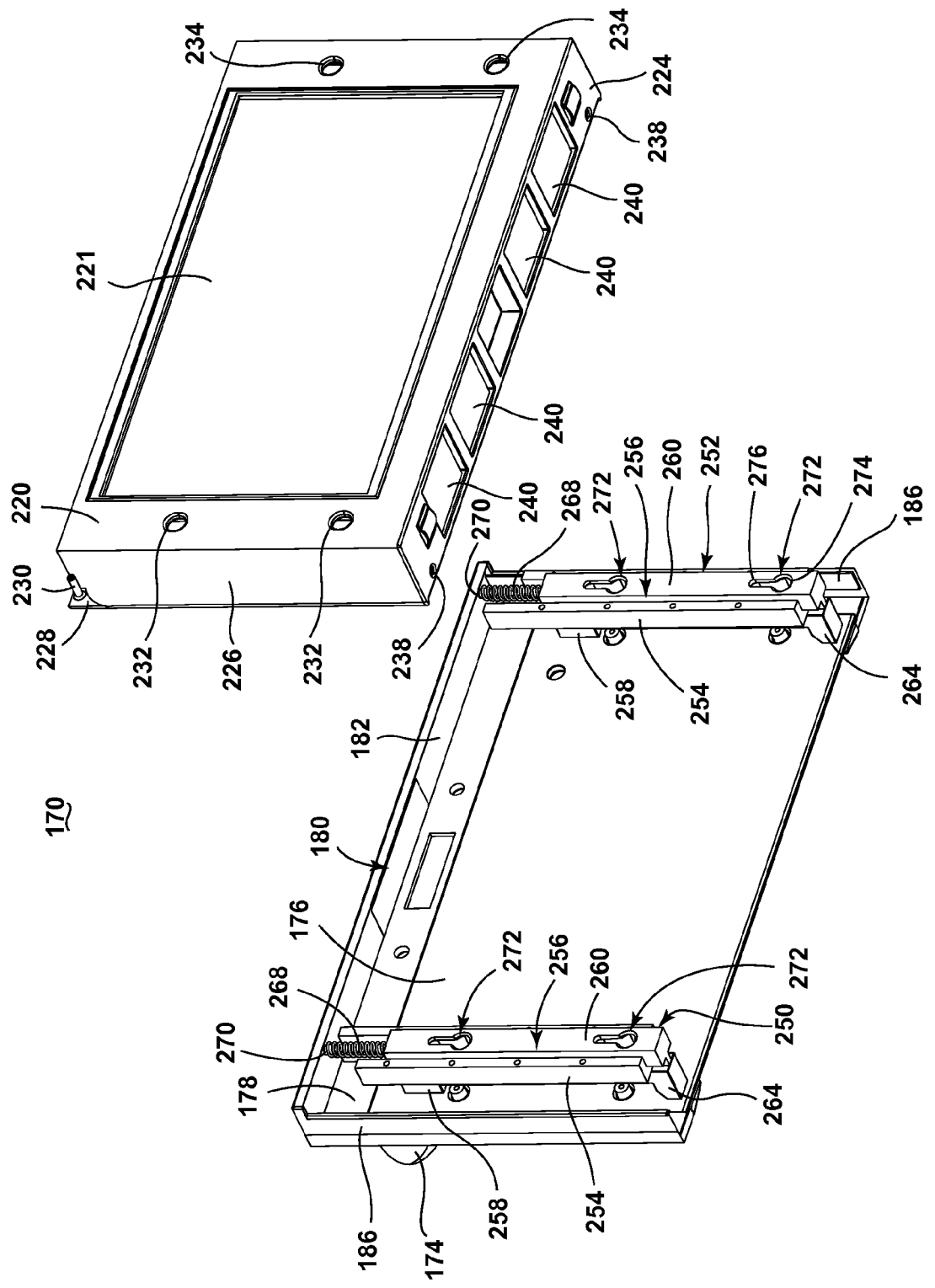

The description of the upper door 170 continues with reference to FIGS. 8A and 8B, which are exploded rear views of the upper door 170. A rear panel 220 surrounding and supporting a rear window 221 encloses the rear side of the upper door 170. The rear panel 220 may be generally rectangular with opposing top and bottom walls 222, 224 and opposing side walls 226. An upwardly extending lip 228 oriented generally perpendicular to the top wall 222 may carry a pair of pins 230 located at opposite ends of the lip 228 and projecting rearward, that is, towards the interior of the dishwasher 10 when the door 14 is closed. The rear panel 220 may be sized for receipt by the front panel 178 with space between the respective top walls 182, 222 and between the side walls 226 and the bezel 186. The rear portion of the upper door 170 may include several apertures. For example, two pair of generally circular apertures 232, 234 may be positioned with one pair on each side of the rear window 221, each pair having two vertically aligned apertures. Further, a pair of apertures 236 may be positioned at opposite ends of the top wall 222, and another pair of apertures 238 may be located at opposite ends of the bottom wall 224. The upper door 170 may also house a power source or assembly, which is shown in the illustrated embodiment as a plurality of batteries 240 mounted along the bottom wall 224, electrically coupled to the user interface 180 and to the charging port 188 on the front panel 178 (FIG. 1).

Figure 9:
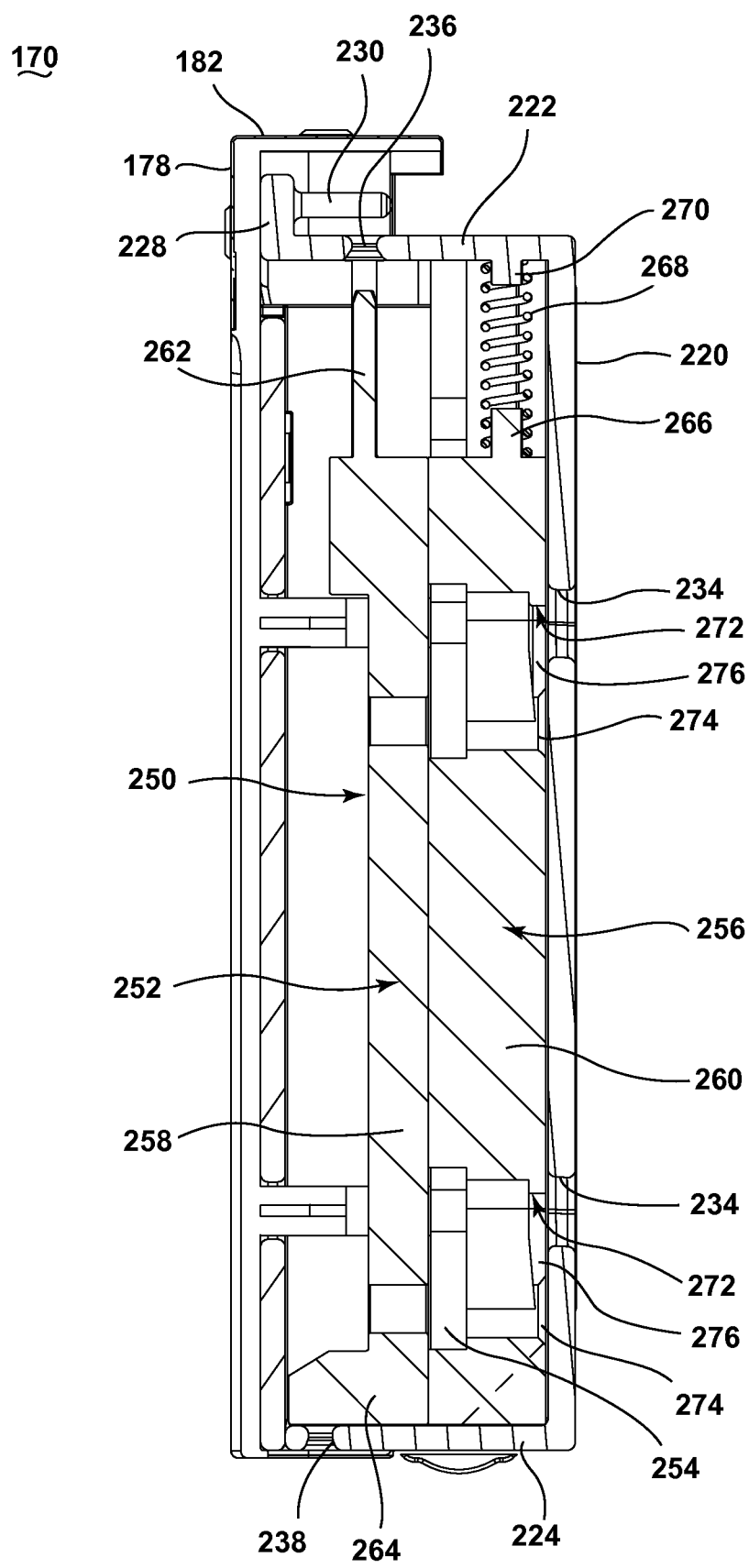
FIG. 9 is a sectional view of the upper door taken through line IX-IX of FIG. 8A.

To facilitate transformation between the drawer mode and the door mode for the door 14, a transformation assembly 250 may be positioned within the upper door 170. The transformation assembly 250 of the present embodiment includes two sets of transformation mechanisms 252, one located on each side of the upper door 170 and slidably mounted within the upper door 170 by a bracket 254. As best seen in FIG. 9, which is a sectional view of the upper door taken through the line IX-IX in FIG. 8A, each transformation mechanism 252 may include a locking member in the form of a lock block 256 having generally elongated, vertically oriented front and rear parts 258, 260 coupled for cooperative movement. The front part 258 terminates at its upper end at an upwardly extending locking finger 262 aligned vertically with the corresponding aperture 236 of the rear panel top wall 222 and at its lower end at a forwardly projecting foot 264 that covers the corresponding aperture 238 in the rear panel bottom wall 224. The rear part 260 terminates at its upper end at an upwardly extending post 266 that receives one end of a compression spring 268. The compression spring 268 in its rest state pushes the lock block 256 downward, away from the rear panel top wall 222, which includes a downwardly extending post 270 that receives the opposite end of the spring 268. Referring back to FIGS. 8A and 8B, the rear part 260 of the lock block 256 further includes a pair of vertically aligned key slots 272 having a circular portion 274 and an upwardly extending linear portion 276 with a width smaller than the diameter of the circular portion 274. The key slots 272 align with the corresponding apertures 232, 234 in the rear panel 220 such that either the circular portion 274 or the linear portion 276 aligns with the corresponding apertures 232, 234 when the lock block 256 slides within the bracket 254, as will be described in further detail below.

Figure 10:
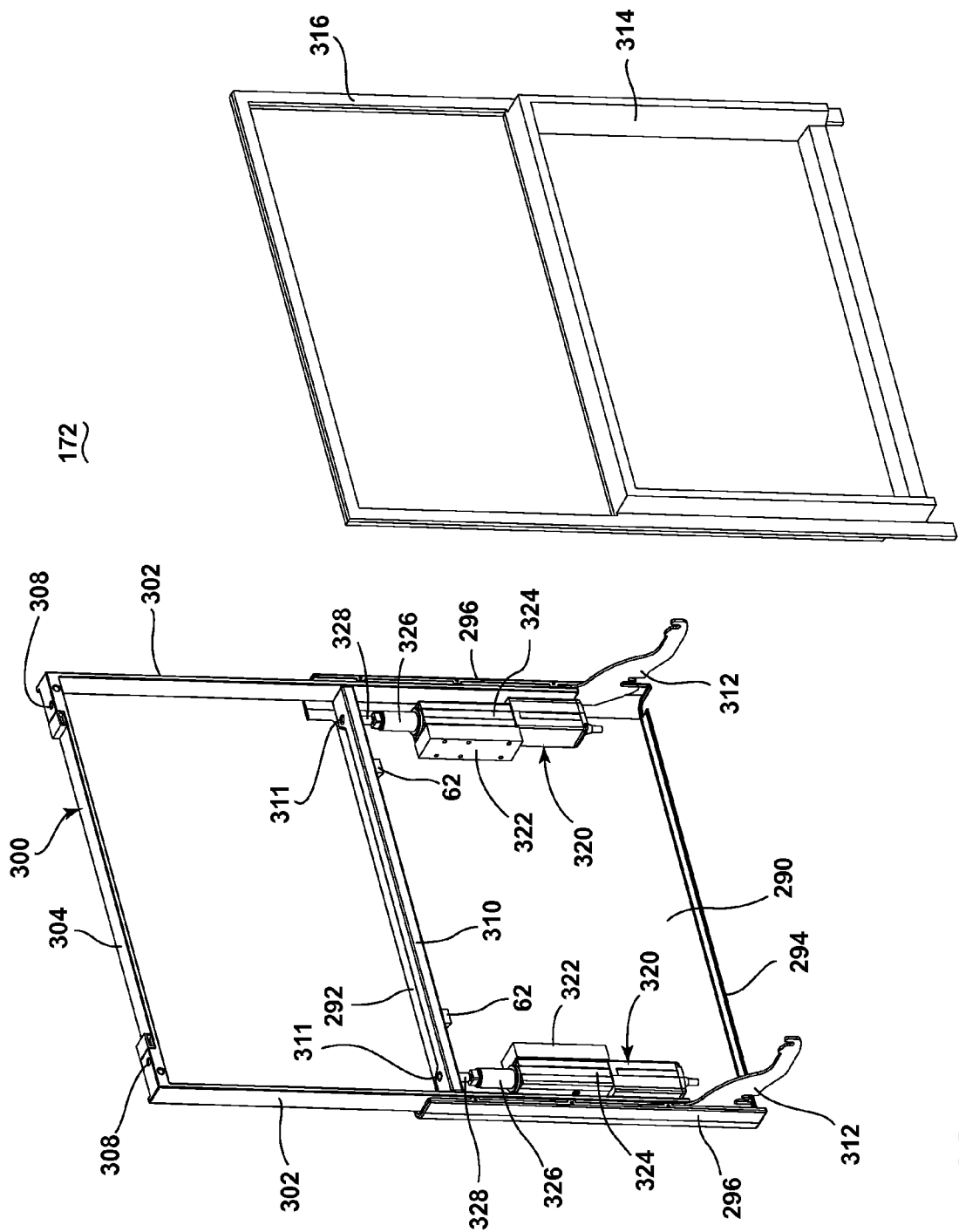
FIG. 10 is a rear exploded view of an embodiment of a lower door of the dishwasher of FIG. 1.

Referring back to FIG. 1, the lower door 172 may include a generally rectangular front panel 290 with a bottom wall 294 and may wrap around a portion of the sides of the lower door 172 to form a bezel 296. As shown in FIG. 10, which is an exploded view of the lower door 172 showing a rear side of the lower door 172, an upper lip 292 of the front panel 290 may extend rearward and generally perpendicular to the upper edge of the front panel 290. The front panel 290 may be mounted to a generally U-shaped door frame 300 having side arms 302 that extend within and along the bezel 296 and above the front panel 290 and a top arm 304 that joins the upper ends of the side arms 302. The portion of the side arms 302 above the lower door front panel 290 and the top arm 304 are sized for receipt by the upper door 170, as will be described in further detail below, and define an opening through which the drawer 40 may be sized for slidable movement. The top arm 304 includes a pair of apertures 308, with the apertures 308 located at opposite ends of the top arm 304.

A horizontal bracket 310 with a pair of spaced apertures 311 spans the frame 300 below the front panel upper lip 292, and hinges 312 may be mounted to the lower ends of the frame 300 to pivotally mount the lower door 172 to the chassis 12. The bracket 310 supports a pair of upper door positional sensors 62. The upper door positional sensors 62 interact with the upper door 170 to detect the position of the upper door 170 relative to the lower door 172 (i.e., the alignment of the upper and lower doors 170, 172) and may be any suitable type of sensors, such as reed switches, for example. A rear panel 314 sized similarly to the front panel 290 and having a generally U-shaped peripheral frame 316 that mates with the door frame 300 encloses the lower door 172 on its rear side. At least a portion of the rear panel 314 and/or the frame 316 may be constructed of a magnetic material, such as metal, for magnetic communication with the electromagnetic latches 66 on the tub 16 (FIG. 5).

Between the front and rear panels 290, 314, the lower door 172 houses a pair of horizontally spaced actuator assemblies 320, each one mounted to the lower door 172 by a mounting bracket 322. The actuator assembly 320 may be an electrical actuator but could be any type of suitable actuator, including a mechanical actuator, such as a mechanical linkage assembly with a lead screw and motor, a pneumatic actuator, or a hydraulic actuator. Further, the actuator assembly 320 may be configured such that it may be located within the upper door 170 rather than the lower door 172. For example, a mechanically actuated actuator assembly may be adapted to fit within the upper door 170 to selectively couple the upper door 170 with the lower door 172. The illustrated actuator assembly 320 includes a housing 324 coupled to a cylinder 326 within which an upwardly extending actuating rod 328 sized and positioned for receipt through the corresponding aperture 311 on the rear panel bracket 310 may be slidably mounted.

Figure 11:
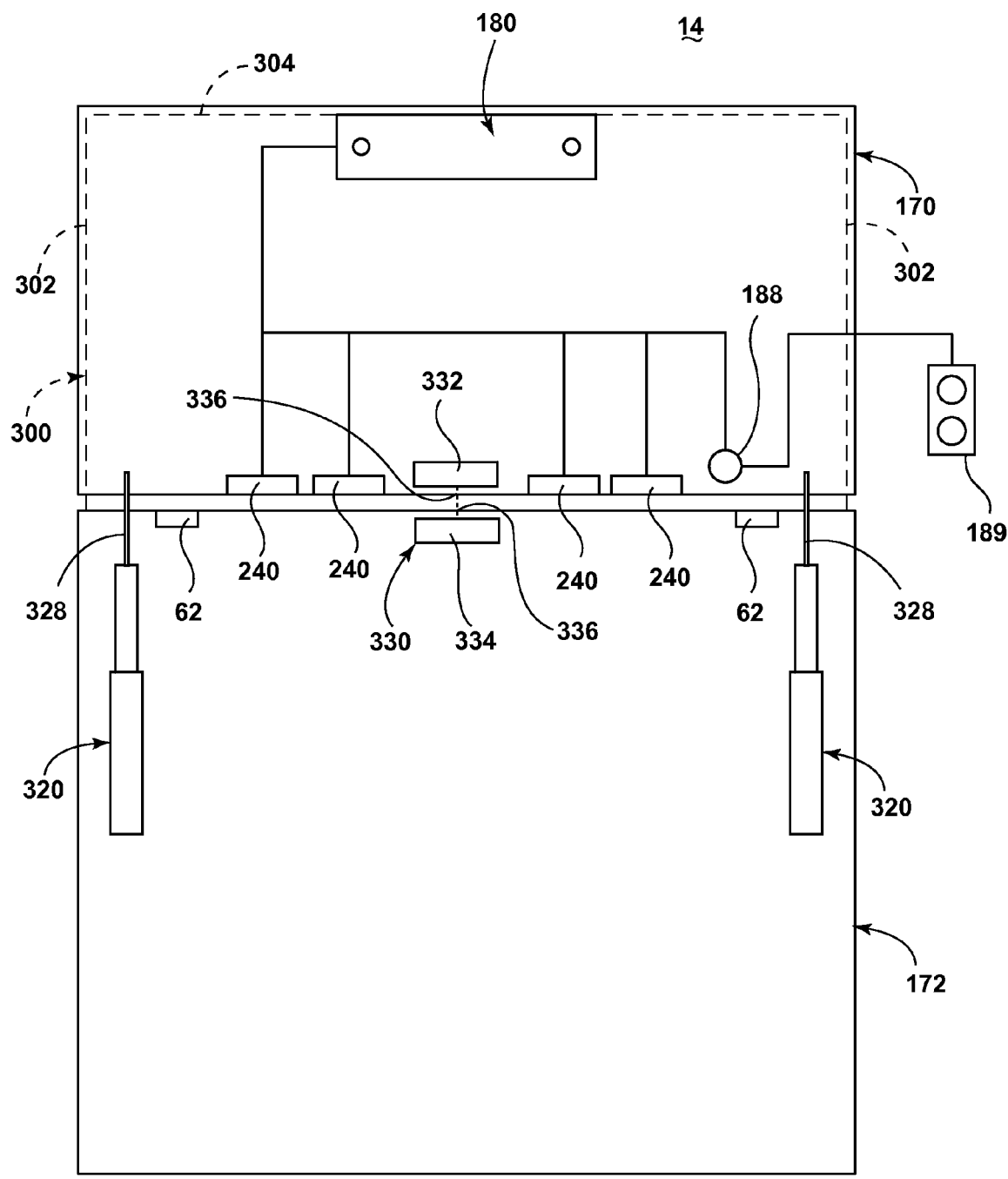
FIG. 11 is a schematic view of an embodiment of the door of the dishwasher of FIG. 1 illustrating various electrical components carried by the door, including a door alignment sensing assembly.

The door 14 houses several electrical components, such as sensors, switches, and devices, for the dishwasher 10. FIG. 11 provides a schematic view of the door 14 and its corresponding electrical components. The lower door 172 carries the actuating assemblies 320, which may require electricity depending on the type of actuator employed for moving the actuating rod 328, and the upper door proximity sensors 62.

As discussed above, the upper door 170 carries the user interface 180, the power assembly in the form of the batteries 240, and the charging port 188, which are all electrically coupled such that the batteries 240 provide power to the user interface 180. The electrical system may be configured to have the batteries 240 provide power to the user interface 180 at all times, or the batteries may be a supplemental power source, such that the batteries 240 provide power to the user interface 180 only when the door 14 is in the drawer mode, while another electrical system provides power to the user interface 180 when the door 14 is in the door mode. The charging port 188 may be selectively electrically or electromagnetically and wired or wirelessly coupled to an external power charger or source 189, such as a conventional household electrical socket or a direct current (DC) power source, for charging the batteries 240 with low voltage DC power. Optionally, the user interface 180 may include an indicator to communicate to the user a power status of the batteries 240, such as a percentage of power remaining, approximate duration of battery life remaining (e.g., time left in days, minutes, hours, etc.), or a simple alert notifying the user when the batteries 240 need to be or are approaching a condition (e.g., nearing battery chemistry critical thresholds) where they need to be recharged or replaced.

The batteries 240 may be any type of rechargeable or replaceable batteries, including customized or conventional batteries, such as AA, AAA, or other standard batteries, and may be portable power storage devices other than batteries. Further, the power assembly may include any number of portable power storage devices or batteries, including one or multiple batteries, depending on the power demands of the user interface 180 and the type of power storage devices or batteries employed to provide power to the user interface 180. Other alternative methods for charging the batteries 240 include, but are not limited to, transferring power from the lower door 172 to the upper door 170 through the air gap therebetween over an electromagnetic link, whereby the electrical energy may be converted to DC power for battery charging. In another embodiment, the batteries 240 may be removable for recharging using a standard or customized charger, such as a remote inductive charging pad or charger that plugs into a household wall socket, that couples to an external power source rather than coupling the dishwasher 10 to the external power source. In yet another embodiment, the charging port 188 may be internal such that the charging port 188 is not visible to the user when the door 14 is closed. For example, the charging port 188 may be located on an inside surface of the door 14 and may mate with a corresponding dock on the chassis 12 when the door 14 closed. The charging port 188 and the dock may be coupled in any suitable manner or with any suitable type of connection, such as a pin and socket connection, an inductive coupling, or conductive contacts, as with cordless phone chargers.

When the connection between the power supply and the power source for recharging the power supply is a non-wired electromagnetic radiation connection, the power may be transmitted between an electromagnetic radiation transmitter coupled to the power source and an electromagnetic radiation receiver coupled to the rechargeable power supply such that power from the power source may be transmitted to the rechargeable power supply by electromagnetic radiation. Examples of the electromagnetic radiation transmitter include an electromagnetic short, medium, or microwave generator. As another example, a magnetic field generator may be coupled to the power source, and a magnetic field receiver may be coupled to the rechargeable power supply.

In addition to the above electrical components, the door 14 may include, as part of the aforementioned closing system, a door alignment sensing assembly or device 330 to ensure that the upper and lower doors 170, 172 are properly aligned prior to transforming the door from the drawer mode to the door mode when the door 14 is closed. In the illustrated schematic embodiment, the door alignment sensing assembly 330 may employ one or more infrared (IR) beams or other type of communication, such as a visible light optoelectronics link, transmitted between the upper and lower doors 170, 172 to establish a data communication link. A first data connector in the form of, for example, a transmitter 332 may be located in one of the upper and lower doors 170, 172 with a corresponding second data connector in the form of, for example, a receiver 334 in the other of the upper and lower doors 170, 172. Optionally, the data connectors 332, 334 may be transceivers having the ability to both transmit and receive data. At least one partition, such as the walls of the upper and lower doors 170, 172, between the transmitter 332 and the receiver 334 may include an aperture 336 sized and positioned for transmission of the IR beam, or other visible light optoelectronic beam, from the transmitter 332 to the receiver 334 only when the upper and lower doors 170, 172 are properly aligned for transformation.

The electrical components carried by the door 14 and other components of the dishwasher 10 communicate with an electronic control, shown in the illustrated embodiment as a controller 340, that may be located in the chassis 12 below the tub 16 as part of the pump and filter unit 84 (FIG. 6). The controller 340 may be a single controller for both the upper and lower treatment chambers 56, 70 and may be operably coupled to various components of the dishwasher 10 to implement a treating cycle of operation in one or both of the upper and lower treatment chambers 56, 70 and to transform the door 14 between the drawer and door modes. As illustrated herein, the controller 340 may be part of the pump and filter unit 84 to provide a compact and modular assembly for installation within the dishwasher 10; however, one or more components shown as integrated with each other in the pump and filter unit 84 may also be provided separately.

The controller 340 may communicate with the components of the dishwasher 10 located in the door 14 over a wireless communication link using a wireless communication protocol. The wireless communication link and protocol may be any type of wireless communication, including radio frequency, microwave, and infrared (IR) communications, and communications involving bit by bit, RS232, WIDE, I2C, etc. The controller 340 may also communicate with the user over Wi-Fi or wireless telecommunications to a portable computing device, such as a tablet computer or phone, for controlling the dishwasher 10 remotely. Alternatively, the controller 340 may communicate with the components of the dishwasher 10 over wired connections, if desired. The controller 340 may be positioned in locations of the dishwasher 10 other than below the tub 16, such as in other locations on the chassis 12 or on the door 14.

Figure 12:
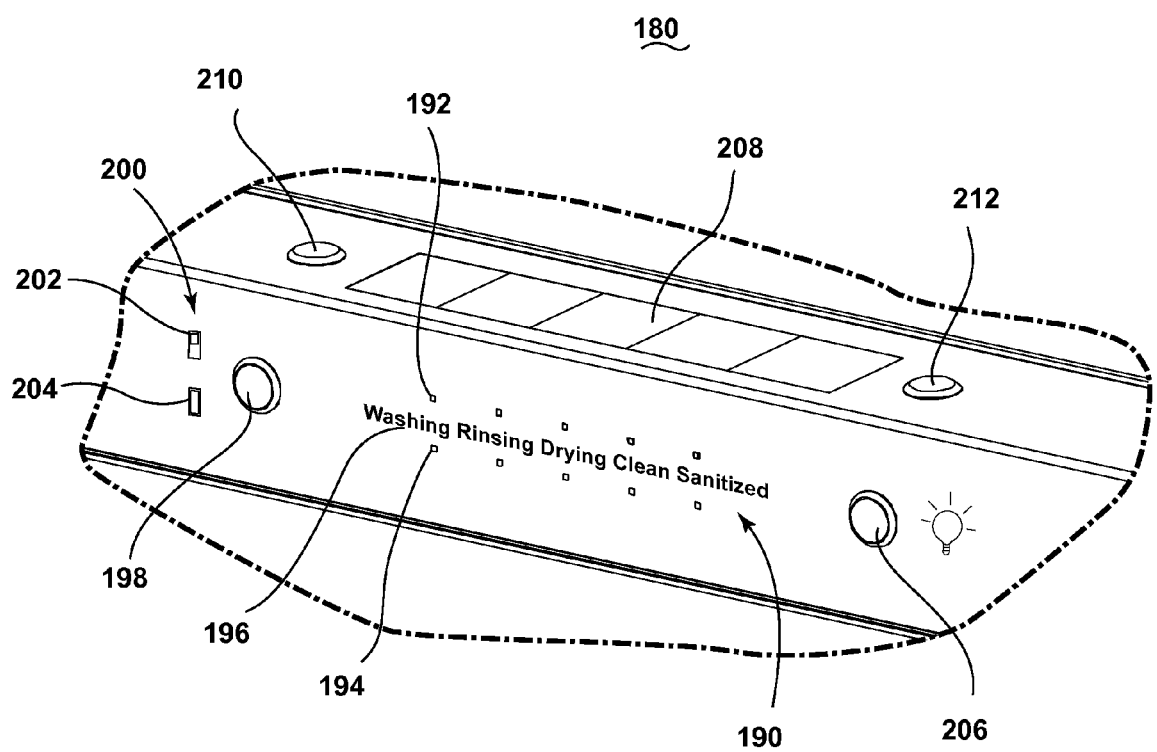
FIG. 12 is an enlarged view of the region labeled XII in FIG. 1 illustrating an embodiment of a user interface for the dishwasher.

As mentioned above, the controller 340 may be operably coupled with the user interface 180, shown in an enlarged view in FIG. 12, which may include various indicators and/or selectors for communicating with the user of the dishwasher 10. For example, the user interface 180 may provide operation cycle indicators 190 that communicate to the user a state of operation of the dishwasher 10, such as washing, rinsing, drying, clean, and sanitized. The operation cycle indicators 190 may include multiple sets of indicators to communicate the state of operation for the individual treatment chambers 56, 70, and in the illustrated embodiment, an upper set of indicators 192 corresponding to the upper treatment chamber 56 and a lower set of indicators 194 corresponding to the lower treatment chamber 70 arranged by example in upper and lower rows of lights may be positioned adjacent status labels 196 communicating various states of operation. For exemplary purposes, the status labels 196 shown on the user interface 180 are washing, rinsing, drying, clean, and sanitized, although any suitable status labels 196 may be employed.

The user interface 180 may further include a mode selector 198, such as a button, to enable the user to select the drawer mode or the door mode for the door 14 of the dishwasher 10 and thereby effect transformation of the door 14 to the door mode or the drawer mode. Mode indicators 200 may be provided near the mode selector 198 to communicate to the user the current mode for the door 14 and the mode enabled by actuation of the mode selector 198. As an example, the illustrated embodiment of the mode indicator 200 includes a drawer mode indicium 202 with a light corresponding to the upper door 170 and a door mode indicium 204 with a light corresponding to the upper and lower doors 170, 172. Actuation of the mode selector 198, such as by pressing the button one or more times, may cause cycling through the lights of the mode indicator 200 to communicate to the user selection of the drawer mode or the door mode. In the illustrated embodiment, the mode selector 198 and the mode indicator 200 are shown, respectively, as a button and as indicium with lights but may have any suitable form and, further, may be provided in any suitable location on the dishwasher 10. Alternative forms for the mode selector 198 may include, for example, a button or other actuator located on the handle 174, a switch operated by the foot of the user near the bottom of the door 14, selectors on a display, such as an LCD panel, and the handle 174 itself, whereby actuation of the mode selector may be achieved by twisting or otherwise moving or manipulating all or a portion of the handle 174.

The user interface 180 may further provide other selectors, such as an illumination selector 206 to control actuation of an illumination source (not shown) inside the dishwasher 10 and other commonly used selectors 208, such as dishwasher operation cycle selectors and operation options selectors. Further, because the user may select operation of a particular treatment chamber 56, 70, the user interface 180 may provide an upper treatment chamber selector 210 and a lower treatment chamber selector 212. The user may choose operation of the upper or lower treatment chamber 56, 70 via the upper and lower treatment chamber selectors 210, 212 prior to selection of an operation cycle and, possibly, options for the selected operation cycle via the commonly used selectors 208. The various selectors 206, 208, 210, 212 may have any suitable form, number, and location, and the selectors 206, 208, 210, 212 are shown in the illustrated embodiment for exemplary purposes.

Further, the user interface 180 is non-removably mounted to the upper door 170 in the present embodiment. In other words, the user interface 180 may not be removed during its use, and disassembly of at least part of the upper door 170 would be required to remove the user interface 180 from the door 14. Other alternative embodiments may include a removable user interface, if desired, such that the user interface would be easily removed from the door 14 without any exterior tools or disassembly of the dishwasher 10.

Figure 13:
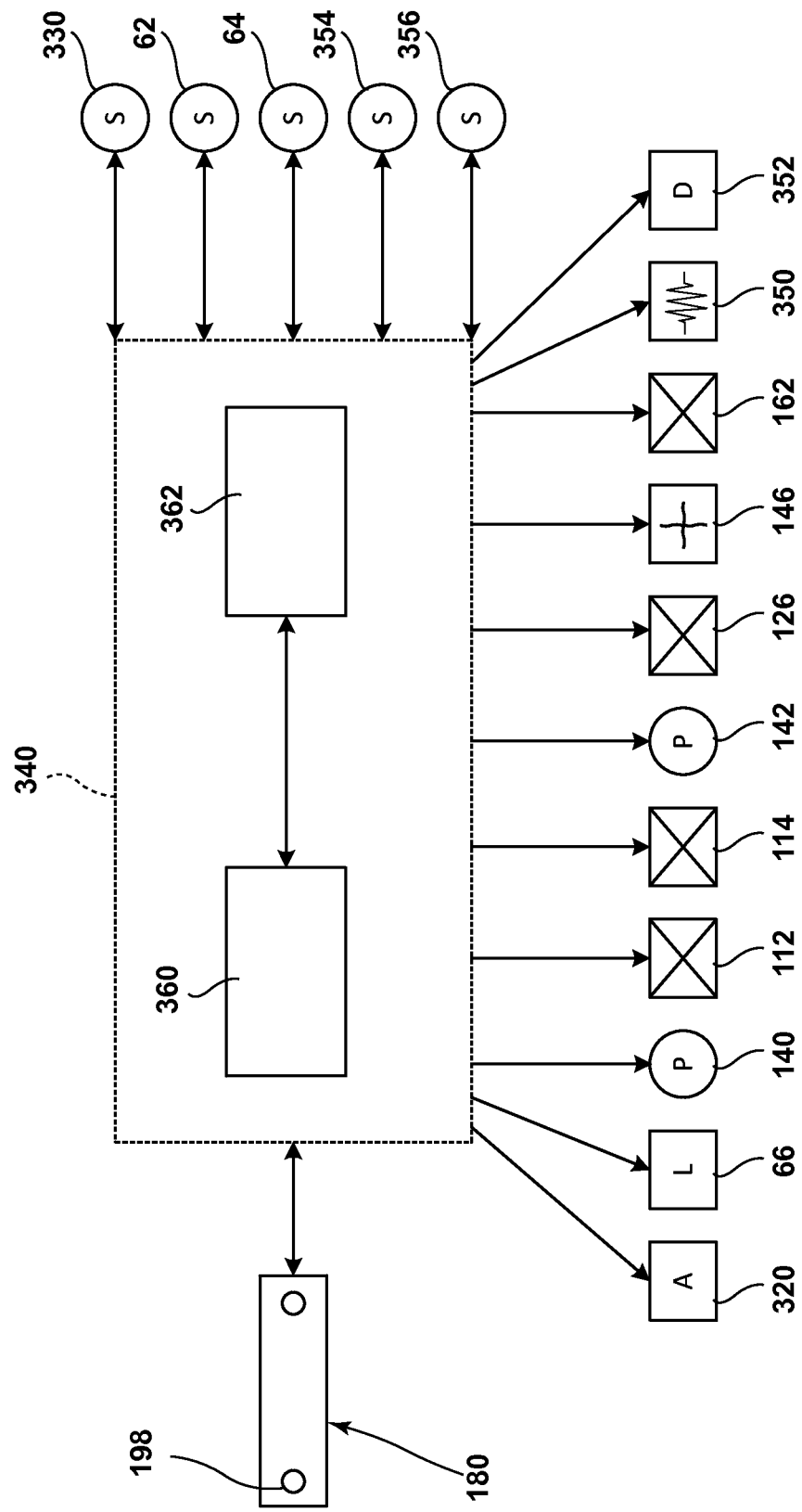
FIG. 13 is a schematic view of an embodiment of a controller and components operably coupled to the controller for the dishwasher of FIG. 1.

Referring now to FIG. 13, which is a schematic view of the controller 340 for the dishwasher 10, the controller 340 may be operably coupled to the user interface 180 to communicate with the user regarding the selection of treatment cycles and options, operation status, and the selection and status of the mode of the door 14 through the mode selector 198 and mode indicators 200. The controller 340 may be also be coupled with the actuator assemblies 320 to execute transformation of the door 14 between the drawer and door modes according to the mode selected by the user via the mode selector 198. Further, the controller 340 may be coupled to the door alignment sensing assembly 330 to detect alignment of the upper and lower doors 170, 172 prior to conversion from the drawer mode to the door mode, the upper door positional sensors 62 and the lower door positional sensors 64 to sense the open or closed positions and the relative positions of the upper and lower doors 170, 172, and the electromagnetic latches 66, which may be activated during conversion between the drawer and door modes and remain activated to lock the lower door 172 to the tub 16 when in the drawer mode.

In addition to being operably coupled with the above electrical components, the controller 340 may be coupled with the supply and recirculation pump 140, the tub inlet diverter 112, and the tub outlet diverter 114 for supply and circulation of fluid in the upper and lower treatment chambers 56, 70 and with the drain pump 142 for drainage of fluid from the dishwasher 10. The controller 340 may be coupled with the supply valve 126 for supplying liquid to the pump and filter unit 84. The controller 340 may also be operably coupled with the blower 146 and the air diverter 162 to provide air into the upper and lower treatment chambers 56, 70. The controller 340 may also be coupled with the heater 350 to heat the fluid and/or air depending on the step being performed in the cycle of operation. The controller 340 may also be coupled to dispensers 352 provided in each of the upper and lower treatment chambers 56, 70 for dispensing a detergent during a wash step of a cycle of operation or a rinse aid during a rinse step of a cycle of operation, for example. Alternatively, a single dispenser may be shared by both of the upper and lower treatment chambers 56, 70.

The controller 340 may also be coupled with one or more temperature sensors 354, which are known in the art, such that the controller 340 may control the duration of the steps of the cycle of operation based upon the temperature detected in the upper and lower treatment chambers 56, 70 or in one of the various conduits of the dishwasher 10. The controller 340 may also receive inputs from one or more other additional sensors 356, examples of which are known in the art. Non-limiting examples of the additional sensors 356 that may be communicably coupled with the controller 340 include a moisture sensor, a turbidity sensor, a detergent and rinse aid presence/type sensor(s), and sensors for detection of overload and overfill states.

The controller 340 may also be provided with a memory 360 and a central processing unit (CPU) 362. The memory 360 may be used for storing control software that may be executed by the CPU 362 in completing a cycle of operation using one or both of the upper and lower treatment chambers 56, 70 of the dishwasher 10 and any additional software. For example, the memory 360 may store one or more pre-programmed cycles of operation that may be selected by a user and completed by one or more of the upper and lower treatment chambers 56, 70. A cycle of operation for the upper and lower treatment chambers 56, 70 may include one or more of the following steps: a wash step, a rinse step, and a drying step. The wash step may further include a pre-wash step and a main wash step. The rinse step may also include multiple steps such as one or more additional rinsing steps performed in addition to a first rinsing. The amounts of fluid and/or rinse aid used during each of the multiple rinse steps may be varied. The drying step may have a non-heated drying step (so called "air only"), a heated drying step, or a combination thereof. These multiple steps may also be performed by the upper and lower treatment chambers 56, 70 in any desired combination.

Referring now to FIGS. 1 and 13, the operation of the dishwasher 10 will now be described with a focus on the operation of the door 14 and the conversion thereof between the drawer and door modes. Details regarding the supply, circulation, and draining of fluid and the delivery of heated and non-heated air to the upper and lower treatment chambers 56, 70 may be found in the aforementioned and incorporated '673 application. The following description is provided for illustrative purposes only with the understanding that the operation may proceed in any suitable order and may be adapted according to variations of embodiments of the dishwasher 10. While the operation description will include reference to different figures, inherent reference to FIG. 13 may continually be made when discussing communication between the controller 340 and various components of the dishwasher 10.

As described above, the user of the dishwasher 10 may access only the upper treatment chamber 56 when the door 14 is in the drawer mode or both the upper and lower treatment chambers 56, 70 when the door 14 is in the door mode. For descriptive purpose only, it will be assumed that the door 14 is initially in the door mode, as indicated to the user by the mode indicator 200 on the user interface 180, such as by illuminating the door mode indicium 204.

Referring now to FIG. 14A, which is a sectional view taken through one of the actuator assemblies 320 with the door 14 closed and in the door mode, the actuator assembly 320 is in an engaged position whereby the actuating rod 328 extends through the corresponding aperture 311 in the bracket 310 of the lower door 172 and the corresponding aperture 238 in the bottom wall 224 of the upper door rear panel 220 to abut the foot 264 of the lock block 256 and apply an upward force to push the lock block 256 upward. Application of the upward force to the lock block 256 compresses the spring 268 and forces the locking finger 262 upward through the corresponding aperture 236 on the top wall 222 of the upper door rear panel 220 and through the corresponding aperture 308 on the top arm 304 of the lower door frame 300. The extension of the actuating rods 328 between the upper and lower doors 170, 172 at the lower end of the upper door 170 and of the projection of the locking fingers 262 from the upper door 170 through the lower door frame 300 at the upper end of the upper door 172 effectively locks the upper and lower doors 170, 172 together for the door mode.

Further, in the door mode, the lock blocks 256 decouple the drawer 40 from the upper door 170 so that the door 14 can be opened with a pivoting motion to the position illustrated in FIG. 4. In particular, when the lock block 256 is in the upward position shown in FIG. 14A, the mounting pins 54 on the front frame 50 of the drawer 40 extend through the corresponding apertures 232, 234 on the upper door rear panel 220 and horizontally align with the circular portions 274 of the corresponding key slots 272, as shown in FIG. 14B, thereby allowing movement of the door 14 relative to the chassis 12 without concurrent movement of the drawer 40. In other words, the drawer 40 remains stationary during pivoting movement of the door 14 because the apertures 232, 234 and the circular portions 274 of the key slots 272 on the lock blocks 256 easily slide onto and off of the mounting pins 54.

To convert the door 14 from the door mode to the drawer mode, the user actuates the mode selector 198 on the user interface 180, such as by depressing the button. The user interface 180 communicates the mode selection to the controller 340, which, in turn, communicates with the door alignment sensing assembly 330 to ensure proper alignment between the upper and lower doors 170, 172 and with the upper door and lower door positional sensors 62, 64 to confirm that the upper and lower doors 170, 172 are both closed and aligned. Further, the upper door positional sensors 62 detect alignment of the upper door 170 with the lower door 172 when the rear panel 220 is in close proximity to the positional sensors 62. As mentioned above, the lower door positional sensors 64 detect closure of the lower door 172 when the top arm 304 of the frame 300 of the lower door 172 are near the lower door positional sensors 64 on the tub 16. It follows that the controller 340 can confirm closure of both the upper and lower doors 170, 172 by detecting closure of the lower door through the lower door positional sensors 64 and infer closure of the upper door 170 by detecting alignment of the upper door 170 with the closed lower door 172.

Once the alignment and the closed position of the upper and lower doors 170, 172 are confirmed, the controller 340 activates the latches 66 to lock the lower door 172 to the tub 16. Activating the latches 66 may entail providing power to the electromagnets to activate the magnetic force and, thereby, magnetically couple the latches 66 to the metallic frame 316 on the rear panel 314. The latches 66 may remain active during the transformation process and will remain so thereafter when the drawer mode has been selected to keep the lower door 172 locked to the tub 16.

Figure 15A:
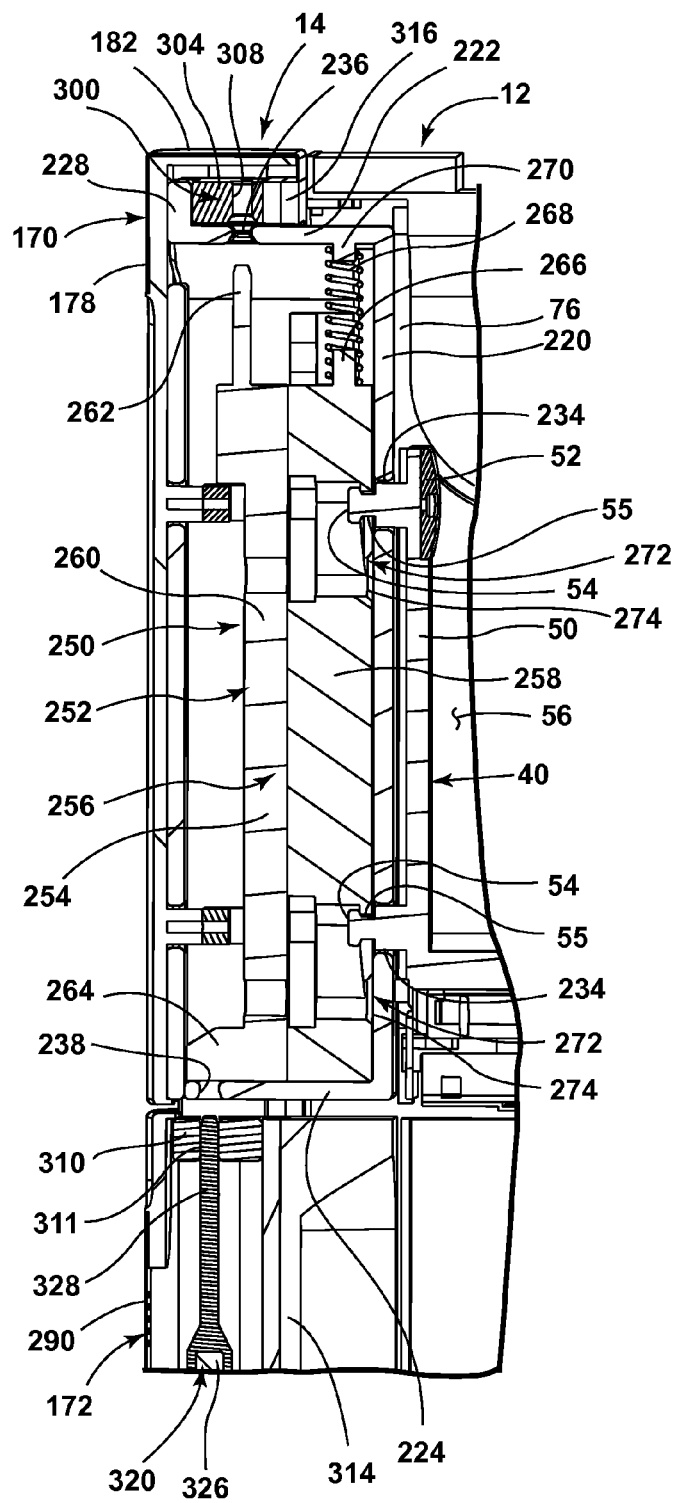
FIG. 15A is a sectional view similar to FIG. 14A, wherein the door is in a drawer mode.
Figure 15B:
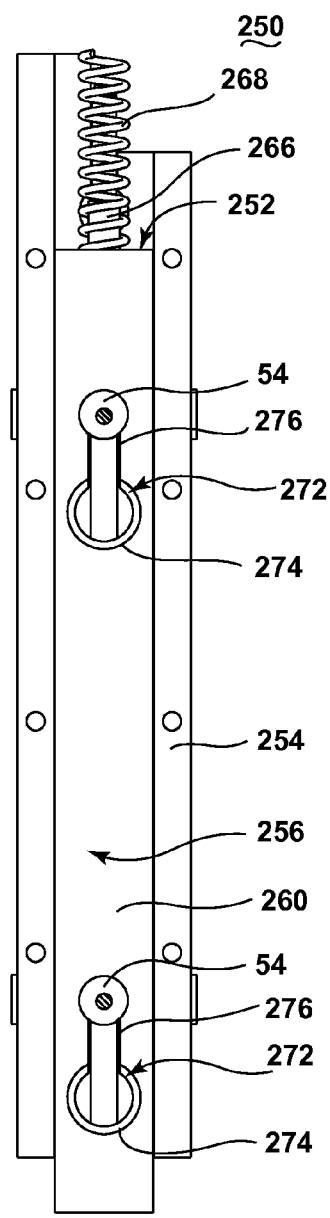
FIG. 15B is a view similar to FIG. 14B showing the position of the mounting pin when the door is in the drawer mode.

With the latches 66 activated, the controller 340 instructs the actuator assemblies 320 to transform the door 14 from the door mode to the drawer mode. Referring now to FIG. 15A, which is a sectional view similar to FIG. 14A with the door 14 in the drawer mode, the actuator assembly 320 retracts the actuating rod 328 through the corresponding aperture 238 in the bottom wall 224 of the upper door rear panel 220 and the corresponding aperture 311 in the bracket 310 of the lower door 172 to a resting position within the lower door 172. The retraction of the actuating rod 328 and, thereby, removal of the upward force on the lock block 256 allows the spring 268 to expand to its natural state and push the lock block 256 downward against the bottom wall 224 of the upper door rear panel 220. Further, the downward movement of the lock block 256 disengages the locking finger 262 from the lower door frame 300 as the locking finger 262 moves downward through the corresponding aperture 308 on the top arm 304 of the lower door frame 300 and through the corresponding aperture 236 on the top wall 222 of the upper door rear panel 220 into the upper door 170. With the actuating rod 328 positioned entirely within the lower door 172 and the locking finger 262 residing completely within the upper door 170, the upper and lower doors 170, 172 are unlocked for the drawer mode. While the travel distance of the actuating rods 328 may depend on the configuration of the door 14, an exemplary travel distance may be about 1-1.25 inches (25.4-31.8 mm).

Figure 16:
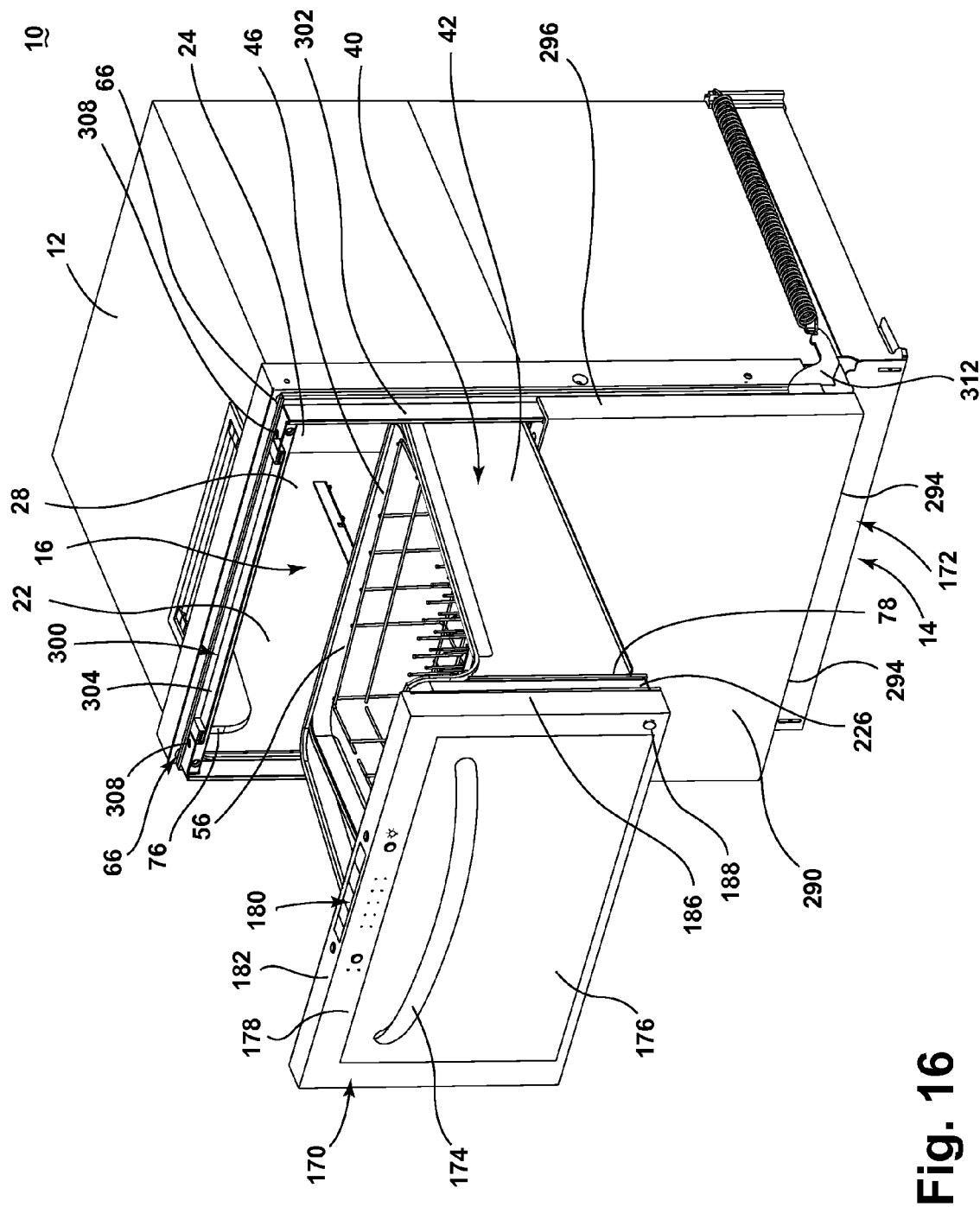
FIG. 16 is a perspective view of the dishwasher of FIG. 1 with the door in the drawer mode and the upper door in an extended position.

Further, in the drawer mode, the lock blocks 256 couple the drawer 40 to the upper door 170 so that the drawer 40 moves with the upper door 170 when the upper door 170 slides between opened and closed positions. In particular, when the lock block 256 moves to the downward position shown in FIG. 15A, the linear portion 276 of the key slot 272 slidingly receives the notch 55 of the corresponding mounting pin 54 on the front frame 50 of the drawer 40. Because the linear portion 276 of the key slot 272 and the notch 55 of the mounting pin 54 have a respective width and diameter less than the diameters of the adjacent portions of the mounting pin 54, relative horizontal movement between the lock block 256 and the mounting pin 54 is not feasible, and the drawer 40 locks to the upper door 170, thereby enabling sliding movement of the upper door 170 relative to the chassis 12 with concurrent movement of the drawer 40, as shown in FIG. 16, which is a perspective view of the dishwasher 10 with the door 14 in the drawer mode and the upper door 170 slid open to an extended position.

Upon completion of the transformation to the drawer mode, the mode indicator 200 may communicate to the user that the door 14 is now in drawer mode, such as by illuminating the drawer mode indicium 202. As stated above, when the door 14 is in the drawer mode, the latches 66 remain active such that the lower door 172 is locked to the tub 16, and the user cannot access the lower treatment chamber 70. The user may slide the upper door 170 relative to the chassis 12 to selectively access the upper treatment chamber 56.

To convert the door 14 from the drawer mode to the door mode, the user actuates the mode selector 198 on the user interface 180, such as by depressing the button. The user interface 180 communicates the mode selection to the controller 340, which, in turn, communicates with the door alignment sensing assembly 330 to ensure proper alignment between the upper and lower doors 170, 172 and with the upper and lower door positional sensors 62, 64 to confirm that the upper and lower doors 170, 172 are both closed. Once the alignment and the closed position of the upper and lower doors 170, 172 are confirmed, the controller 340 activates the latches 66, if not already activated, to lock the lower door 172 to the tub 16. The latches 66 may remain active during the transformation process until being deactivated by the controller 340 upon completion of the transformation process so that the lower door 172 can move relative to the tub 16.

With the latches 66 activated, the controller 340 instructs the actuator assemblies 320 to transform the door 14 from the drawer mode to the door mode by extending the actuating rods 328 to the engaged position described above. The extension of the actuating rods 328 locks the upper and lower doors 170, 172 together and decouples the drawer 40 from the upper door 172 such that the door 14 may freely pivot relative to the chassis 12. Upon completion of the transformation to door mode, the mode indicator 200 may communicate to the user that the door 14 is now in door mode, such as by illuminating the door mode indicium 204. As stated above, when the door 14 is in the door mode, the latches 66 deactivate such that the lower door 172 can pivot with the upper door 170 as a full door relative to the tub 16, and the user can selectively access both the upper and lower treatment chambers 56, 70.

After transformation of the door 14 from one mode to another selected mode, the door 14 may remain in the selected mode until the user once again transforms the door 14. The door 14 may alternatively have a default mode whereby the door 14 automatically converts to the default mode, either the door mode or the drawer mode, a predetermined duration after transformation of the door 14 if the selected mode is different than the default mode. As another option, the mode of the door 14 may depend on the operation status of the upper and lower treatment chambers 56, 70. For example, the door 14 may default to the drawer mode if a treatment cycle is running or has just been completed in only the upper treatment chamber 56, and the door 14 may default to the door mode if a treatment cycle is running or has just been completed in the lower treatment chamber 70, regardless of whether a treatment cycle is running or has been run in the upper treatment chamber 56.

When the user is ready to run a treatment operation in the upper and/or lower treatment chambers 56, 70, the user may select the desired cycle of operation and possible options for the cycle of operation through the user interface 180 on the dishwasher 10 or through a remote user interface, such as the aforementioned remote tablet computer or phone. The selected cycle of operation may be executed by the controller 340, which communicates the appropriate commands to and receives necessary information from the components of the dishwasher 10. When a treatment cycle is running in only the upper treatment chamber 56, the door 14 may be opened in either the door mode or the drawer mode, both of which will interrupt the cycle in the upper treatment chamber 56. When a treatment cycle is running in only the lower treatment chamber 70, the door 14 may be opened in the door mode, which will interrupt the cycle in the lower treatment chamber 70, or in the drawer mode to access only the upper treatment chamber 56 without interrupting the cycle in the lower treatment chamber 70. When treatment cycles are running in both of the upper and lower treatment chambers 56, 70, which can be running the same or different treatment cycles started at the same or different times, the door 14 may be opened in the door mode to interrupt both of the treatment cycles or in the drawer mode to interrupt only the treatment cycle in the upper treatment chamber 56.

The structure of the door 14 in the embodiment illustrated in FIGS. 1-16 not only enables transformation of the door 14 so that the door 14 may function as drawer but also provides sufficient strength for the door 14 to function as a full door. In particular, the door 14 includes on the lower door 172 the frame 300 that surrounds the upper door 170 so that when the upper and lower doors 170, 172 are coupled, the full door has sufficient strength to withstand the stress induced by the pivoting motion of the full door. Further, the frame 300 may be hidden from the user by the bezel 186 and the top wall 182 of the upper door front panel 178, as evidenced by the inability to view the frame 300 in FIG. 1. Referring to FIGS. 8A and 8B, a channel formed between the rear panel side walls 226 and the bezel 186 and between the rear panel top wall 222 and the front panel top wall 182 may be sized for receipt of the frame 300. The channel without the presence of the frame 300 may be seen in the sectional view of FIG. 9 and with the presence of the frame 300 in the sectional views of FIGS. 14A and 15A.

It is within the scope of the invention to make various modifications to the dishwasher 10. For example, the window formed by the front and rear windows 176, 221 on the upper door 170 may be omitted. Omission of the window would provide additional space in the upper door 170 to employ additional transformation assemblies 250 and corresponding actuator assemblies 320 across the width of the door 14, which may lend additional strength to the door 14 when in the door mode. In another modification, latches, such as electromagnetic latches, may be incorporated between the upper and lower doors 170, 172 to maintain alignment therebetween during the transformation process.

In another embodiment, the door alignment sensing assembly 330 may be modified to incorporate transmission of the IR beam to the controller 340 in the chassis 12 such that misalignment of the upper and lower doors 170, 172 would result in interruption of the IR beam transmission, thereby, preventing communication between the sensing assembly 330 and the controller 340 and the door transformation process.

Figure 17A:
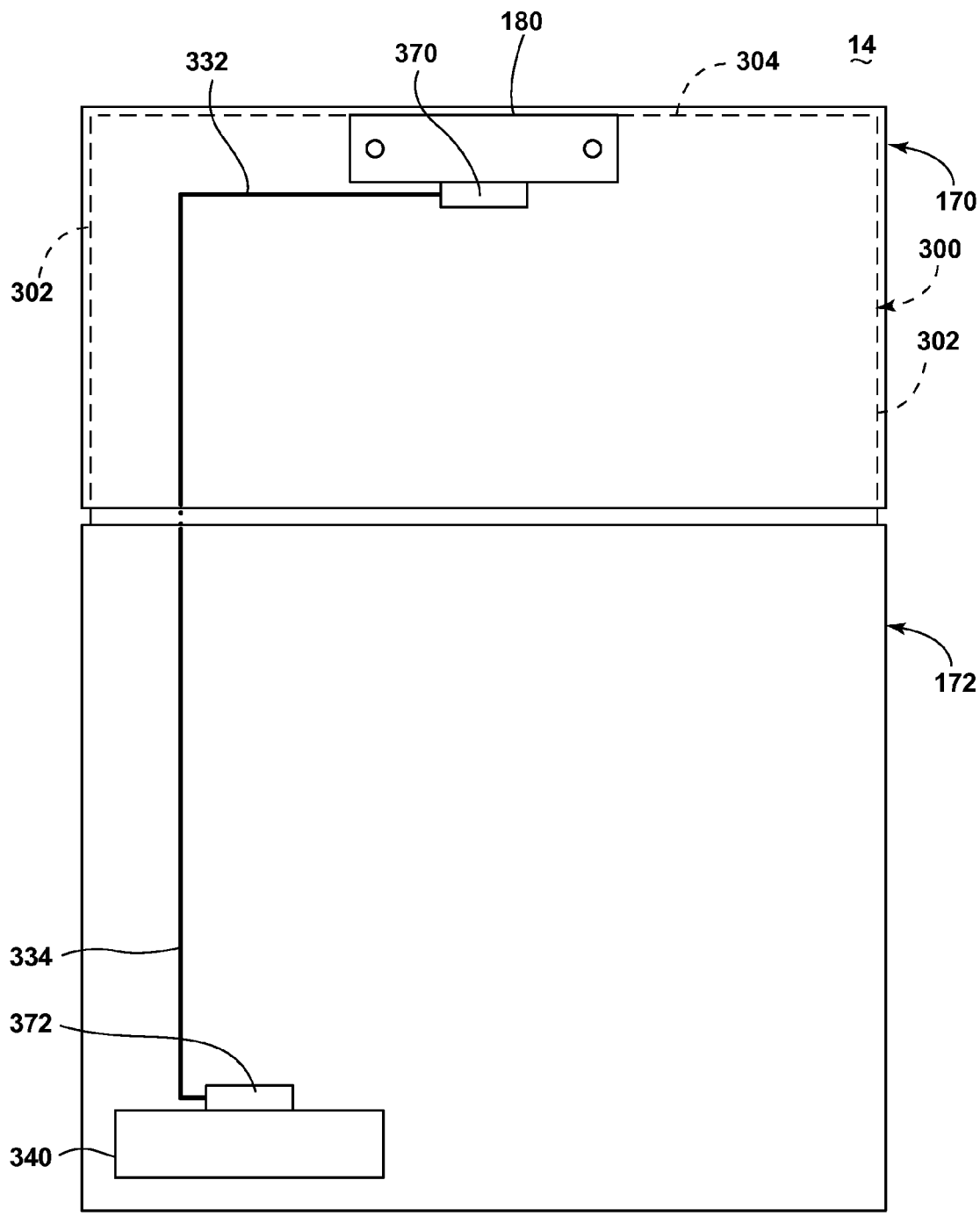
FIG. 17A is a schematic view of an alternative door alignment sensing assembly for the dishwasher of FIG. 1.

In yet another embodiment illustrated schematically in FIG. 17A, the data connector 332 in the upper door 170 may be operably coupled to the user interface 180, and the data connector 334 in the lower door 172 may be operably coupled to the controller 340 such that alignment of the upper and lower doors 170, 172 physically aligns the data connectors 332, 334 in the upper and lower doors 170, 172 and establishes communication between the user interface 180 and the controller 340 and, conversely, misalignment between the upper and lower doors 170, 172 physically misaligns the data connectors 332, 334 in the upper and lower doors 170, 172 and prevents communication between the user interface 180 and the controller 340. The alignment of the upper and lower doors 170, 172 could be detected whether the upper and lower doors 170, 172 are both in opened or closed positions, and the controller 340 could refer to the lower door positional sensors 64 to determine whether the aligned upper and lower doors 170, 172 are opened or closed, if necessary.

The data communication over the communication link between the user interface 180 and the controller 340 through the data connectors 332, 334 may occur in any direction. For example, the data communication may be uni-directional, wherein the communication is from the user interface 180 to the controller 340 or vice-versa from the controller 340 to the user interface 180. As another option, the data communication may be bi-directional between the user interface 180 and the controller 340.

Still referring to FIG. 17A, the data connectors 332, 334 may be any suitable type of connector capable of carrying, transmitting, or receiving data communications. For example, the data connectors 332, 334 may be optical connectors, such as fiber optics. In such an example, the user interface 180 and the controller 340 may be equipped with an illumination transmitter 370 and an illumination receiver 372. For uni-directional communication, each of the user interface 180 and the controller 340 may be equipped with one of the illumination transmitter 370 and the illumination receiver 372. Both of the user interface 180 and the controller 340 may have both of the illumination transmitter 370 and the illumination receiver 372 for bi-directional communication, as shown in FIG. 17A. As mentioned above, the controller 340 may be located in the chassis 12, wherein the fiber optics or other form of the data connector 334 may be configured for communication from the door 14 to the chassis 12, or the controller 340 may be located in the lower door 172, as illustrated by example in FIG. 17A.

In addition to establishing data communication between the user interface 180 and the controller 340, the data connectors 332, 334 may also function as electrical connectors for establishing an electrical path between the controller 340 and the user interface 180. In this manner, the communication link is also a power link whereby power is provided to the user interface 180. Electricity may travel from the controller 340 to the user interface 180 across the connectors 332, 334 in the same manner as described above for data communication. When the data connectors 332, 334 also serve as electrical connectors, they may be any suitable type of connector capable of carrying, transmitting, or receiving data communications and electricity, such as, for example, connectors forming an inductive coupling and the above optical connector. The data connector 332 may further be in communication with a converter (not shown) that converts the transmitted signal into electricity, if needed, for supplying power to the user interface 180. Further, the establishment of the electrical path may serve as a door sensor in a manner similar to that described above for establishment of the data communication; the establishment of the electrical path may form the door sensor to determine when the upper and lower doors 170, 172 are closed and/or aligned.

Figure 17B:
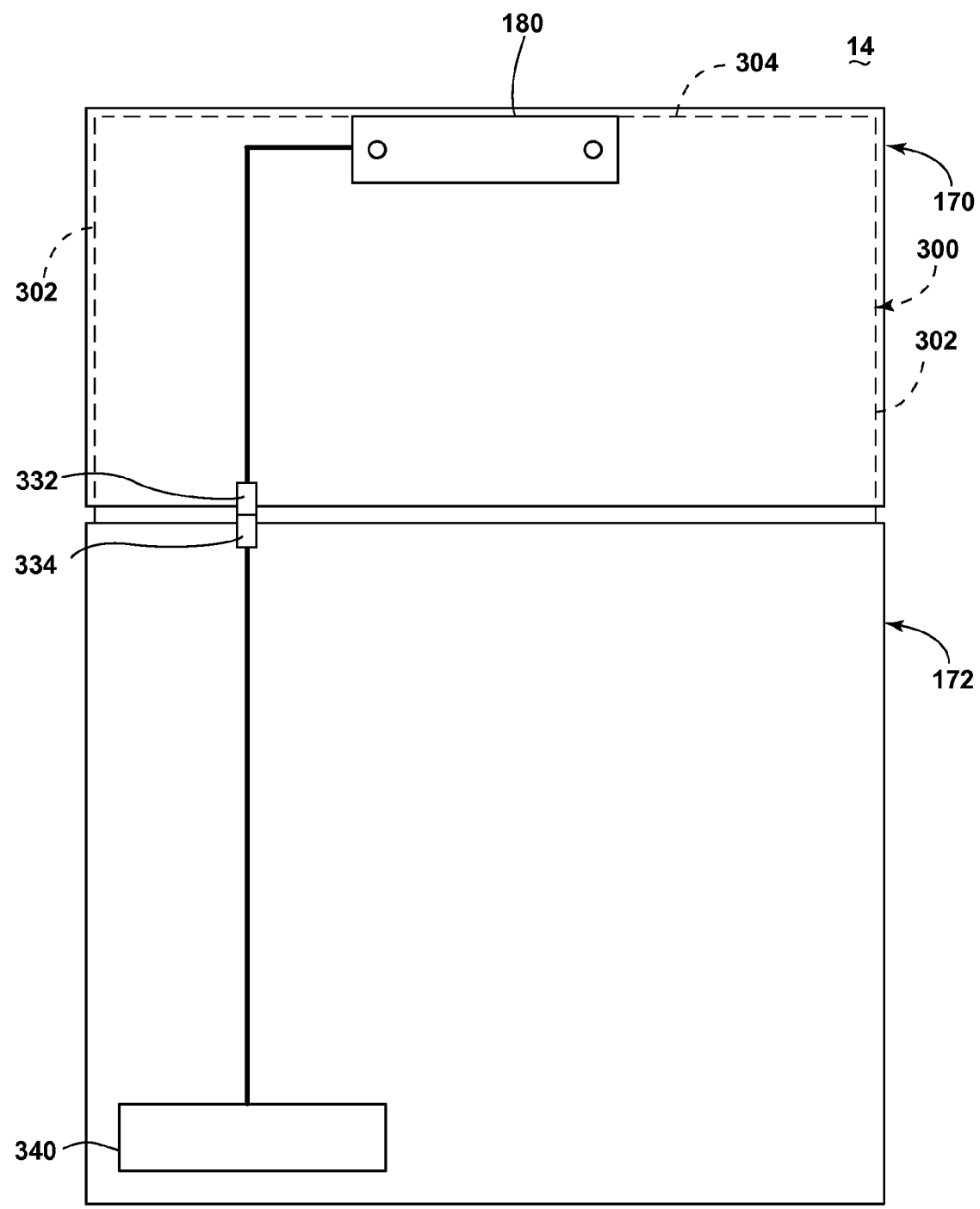
FIG. 17B is a schematic view similar to FIG. 17A of another alternative door alignment sensing assembly for the dishwasher of FIG. 1.

In the example provided in FIG. 17A, the data connectors 332, 334 communicate over the gap between the upper and lower doors 170, 172 with a non-wired link, such as the optical communication link. As another example, the link may be formed by a physical coupling of the connectors 332, 334, which is illustrated in the schematic view of FIG. 17B. The connectors 332, 334 may be configured such that they are uncoupled when the upper door 170 is not aligned with the lower door 172 and automatically couple or physically mate when the upper and lower doors 170, 172 are aligned, such as when the upper and lower doors 170, 172 are both closed.

In another embodiment, omission of the frame 300 may allow access to the lower treatment chamber 70 without concurrent access to the upper treatment chamber 56; the door 14 may be strengthened by other means, such as the aforementioned use of additional transformation assemblies 250 and corresponding actuator assemblies 320. The user would be able to access the upper treatment chamber 56 alone and the lower treatment chamber 70 alone via the respective upper and lower doors 170, 172 in a drawer mode, or both of the upper and lower treatment chambers 56, 70 would be accessible simultaneously with the upper and lower doors 170, 172 coupled in a door mode.

As another alternative, the upper door 170 may be adapted for pivoting movement rather than sliding movement when in the drawer mode, which would enable the drawer 40, not coupled to the upper door 170, to slide forward through the door 14. In another alternative, the lower door 172 rather than the upper door 170 may be adapted for use as a drawer when the door 14 is in the drawer mode.

Figure 18:
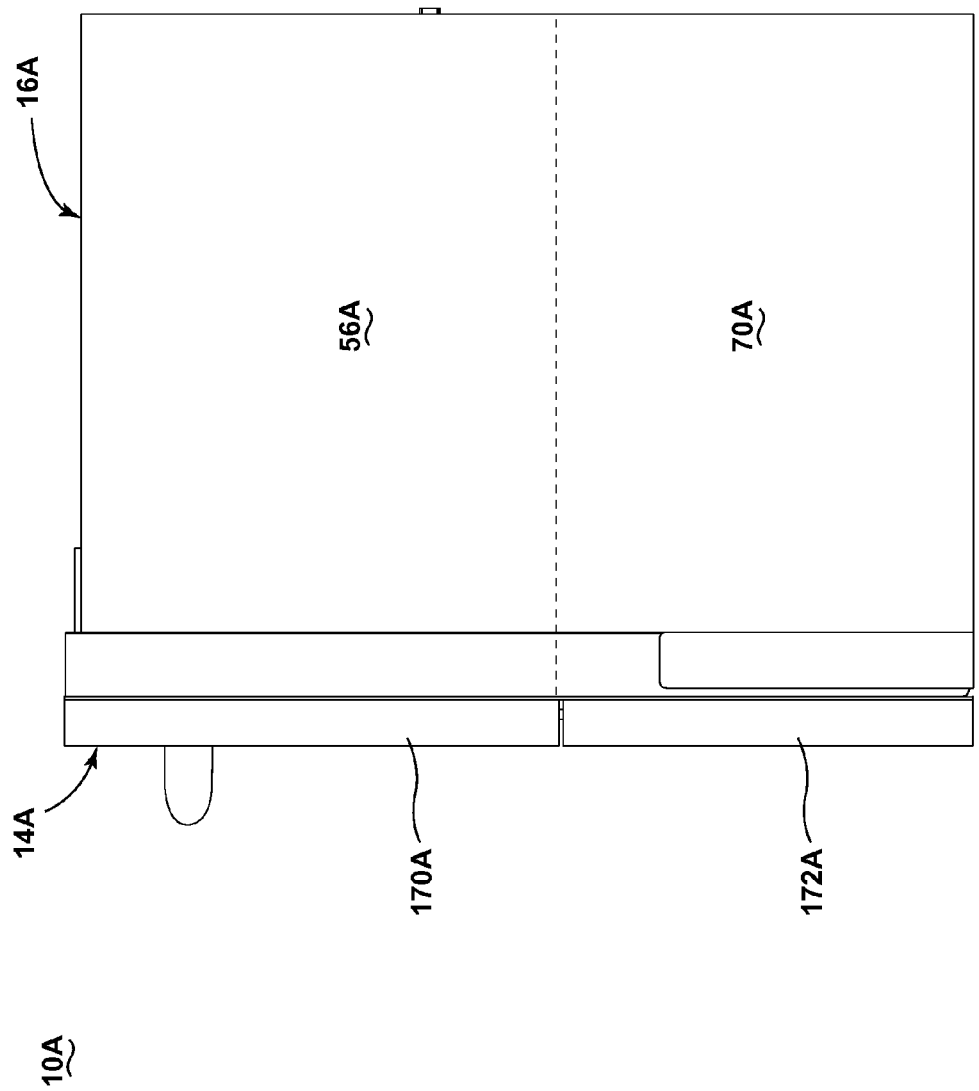
FIG. 18 is a schematic side view of a dishwasher according to another embodiment having a door with an upper door and a lower door in a closed position.
Figure 19:
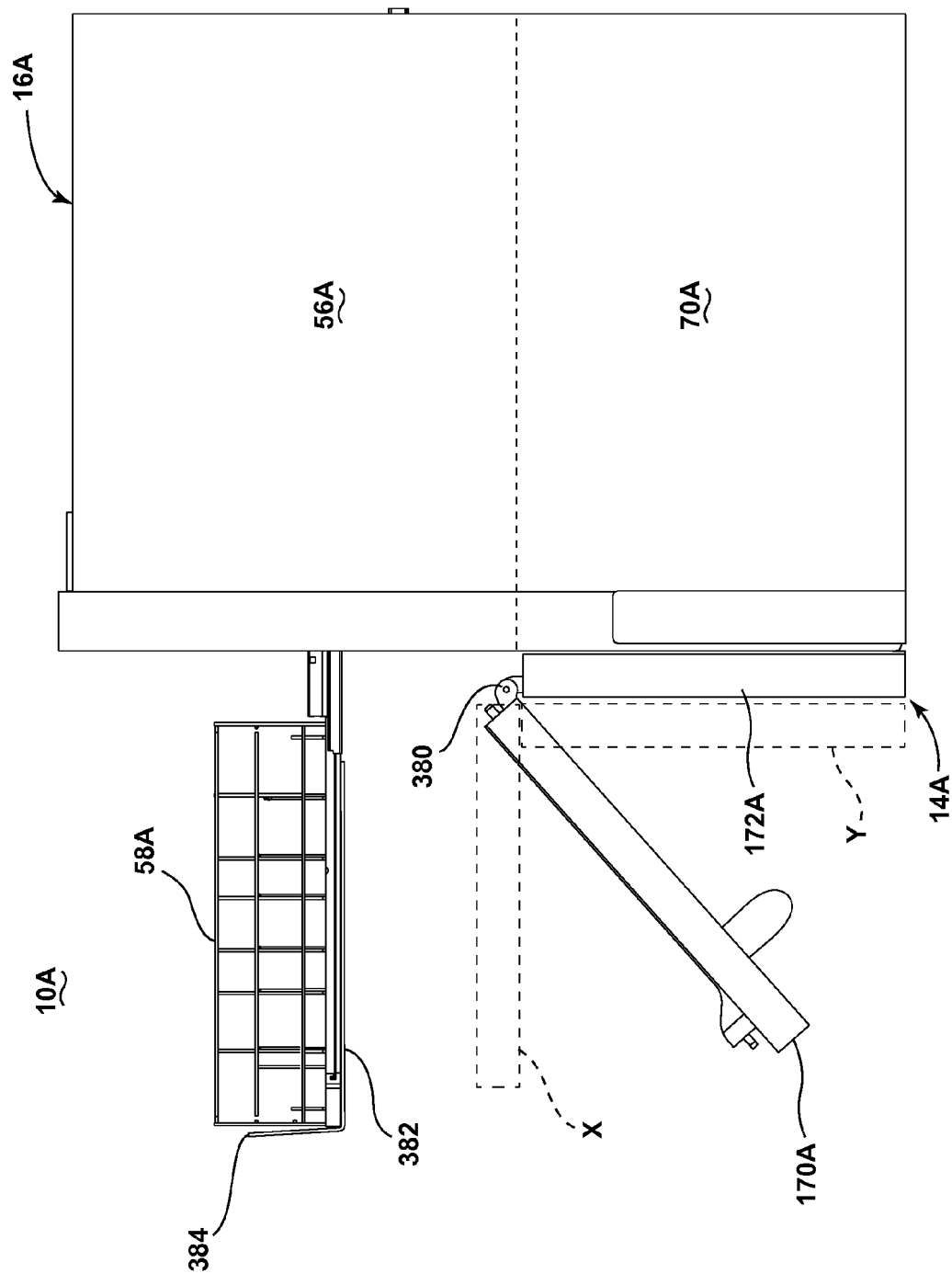
FIG. 19 is a schematic side view of the dishwasher of FIG. 18 with the upper door pivoted open in a partial door mode.
Figure 20:
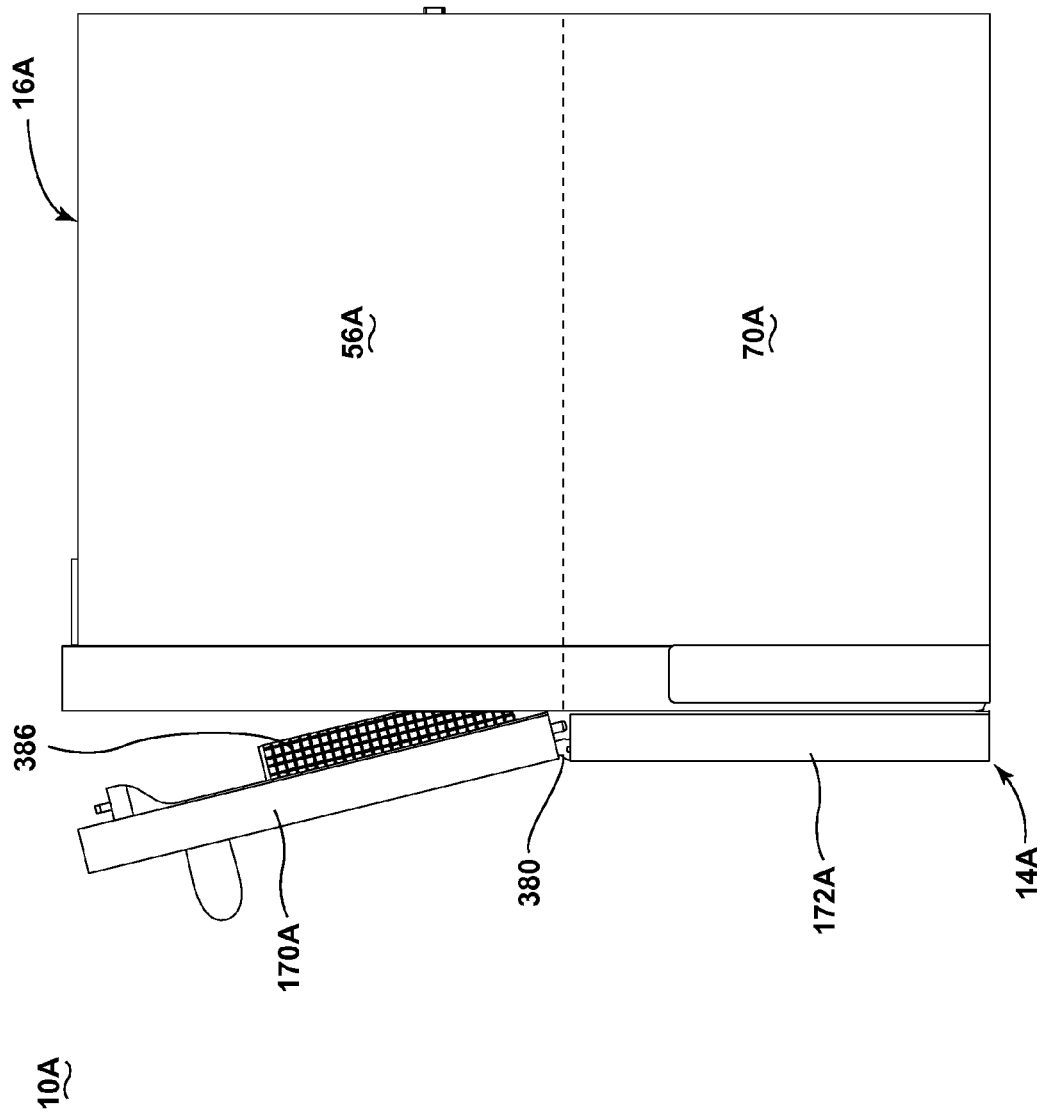
FIG. 20 is a schematic side view of the dishwasher of FIG. 18 with the upper door pivoted partially open in the partial door mode.

FIGS. 18-20 schematically illustrate an exemplary embodiment of a dishwasher 10A wherein the upper door 170A is configured for pivoting movement relative to the lower door 172A when in a partial door mode. Elements similar to those in previous embodiments described above are identified with the same reference numeral bearing the letter "A." Referring to FIG. 18, the door 14A includes the upper door 170A and the lower door 172A that selectively close the respective upper and lower treatment chambers 56A, 70A defined by the tub 16A and access thereto through the open face of the tub 16A. The upper and lower treatment chambers 56A, 70A may be physically separate such that the upper door 170A provides access to only the upper treatment chamber 56A, and the lower door 172A provides access to only the lower treatment chamber 70A. Alternatively, the upper and lower treatment chambers 56A, 70A may be in communication with each other to effectively form a single, common chamber.

As seen in FIG. 19, the upper door 170A may be coupled to the lower door 172A by a hinge 380 or similar connection to provide pivoting movement of the upper door 170A relative to and independently of the lower door 172A. In the partial door mode, the upper door 170A may pivot open to a position that permits movement of the utensil rack 58A relative to the tub 16A. For example, the upper door 170A may open to a position between about 90 degrees and 180 degrees relative to the generally vertical position of the upper door 170A when the upper door 170A is in the closed position of FIG. 18 to allow movement of the utensil rack 58A into and out of the tub 16A. This range of pivotal movement, shown in FIG. 19, defines a lower limit of pivoting movement at position X, wherein movement less than 90 degrees would interfere with movement of the utensil rack 58A, and an upper limit of pivoting movement at position Y, wherein the lower door 172A blocks further pivoting movement of the upper door 170A. The upper door 170A may be configured such that it may or may not be coupled to the lower door 172A in the partial door mode. Regardless of whether the upper door 170A is coupled to the lower door 172B in the partial door mode, the upper door 170A is configured to move independently of the lower door 172A in the partial door mode.

Optionally, the utensil rack 58A may include a drip shield 382 extending along a bottom surface of the utensil rack 58A to catch any liquid or other substance that may fall from the utensil rack 58A when the utensil rack 58A is slid out from the tub 16A. The drip shield 382 may be especially beneficial in a configuration where the upper door 170A opens to a position greater than 90 degrees from the general vertical position such that liquid or other substances may otherwise drip from the utensil rack 58A onto the floor below the utensil rack 58A. The drip shield 382 may extend upward along the front of the utensil rack 58A as well and may include a handle or grip 384 graspable by a user to aid in moving the utensil rack 58A relative to the tub 16A. Optionally, the upper door 170A may be coupled to the utensil rack so that the utensil rack slides from the tub 16A upon opening of the upper door 170A in the partial door mode.

Optionally, in the partial door mode, the upper door 170A may also be configured to be partially opened to a position less than about 90 degrees relative to the generally vertical position, as shown in FIG. 20. In this position, the user is able to access the inside surface of the upper door 170A, that is, the surface facing the tub 16A, and any components mounted on the inside surface of the upper door 170A, such as a silverware basket 386 shown for exemplary purposes in FIG. 20, without having to fully pivot the upper door 170A to the position between about 90 degrees and 180 degrees from the generally vertical position. Another exemplary component that may be located on the inside surface of the upper door 170A may be a detergent dispenser or a dispenser for other types of treating chemistries.

Figure 21:
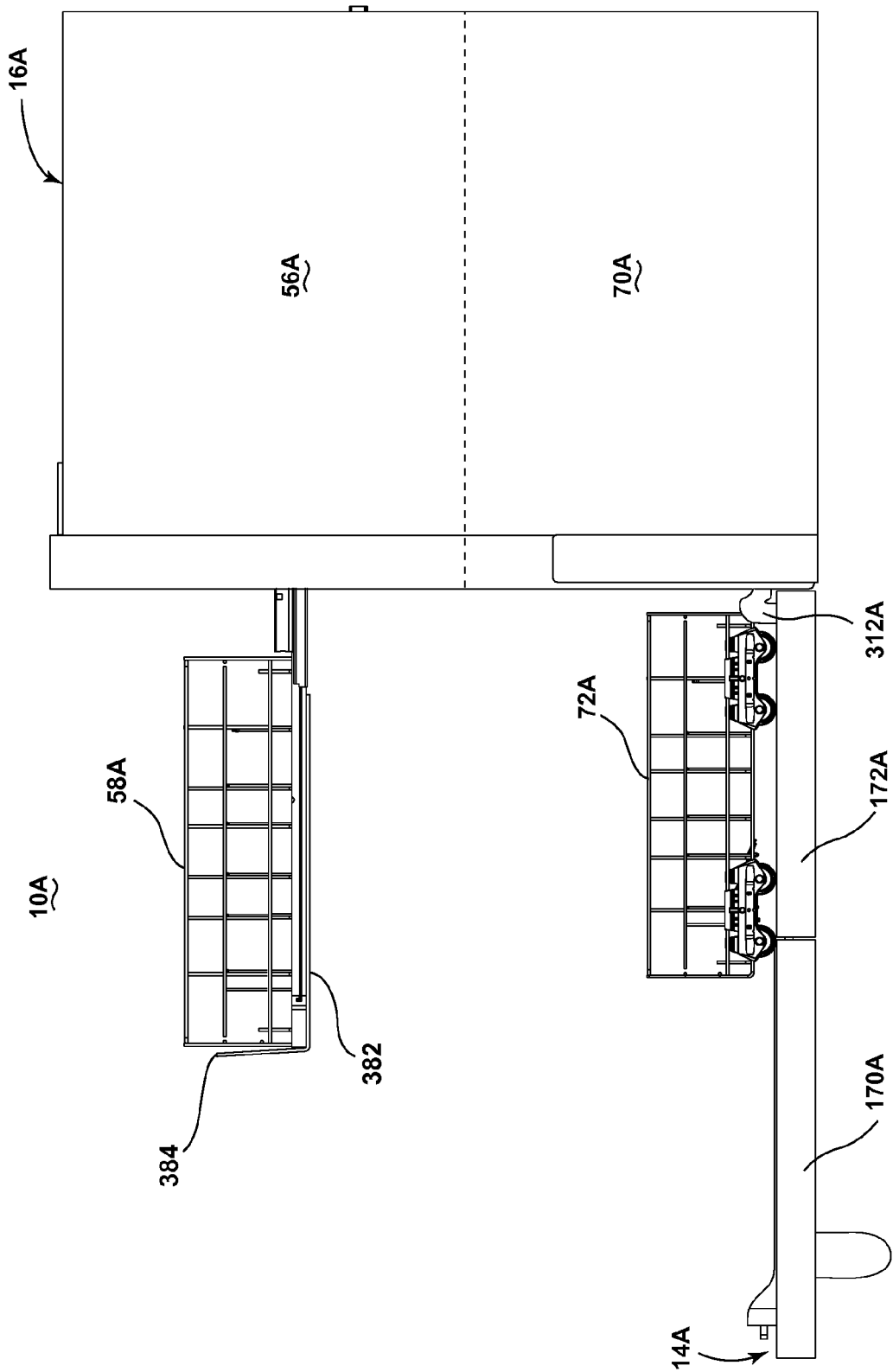
FIG. 21 is a schematic side view of the dishwasher of FIG. 18 with the upper door and the lower door pivoted open together in a full door mode.

When the door 14 operates in a full door mode, the upper door 170A and the lower door 172A are coupled together to form a generally planar full door, as illustrated in FIG. 21, and may pivot together about the hinge 312A relative to the tub 16A to selectively close the upper and lower treatment chambers 56A, 70A and access thereto through the open face of the tub 16A. In this manner, the upper door 170A and the lower door 172A function similarly to a traditional pivotable dishwasher door.

Figure 22:
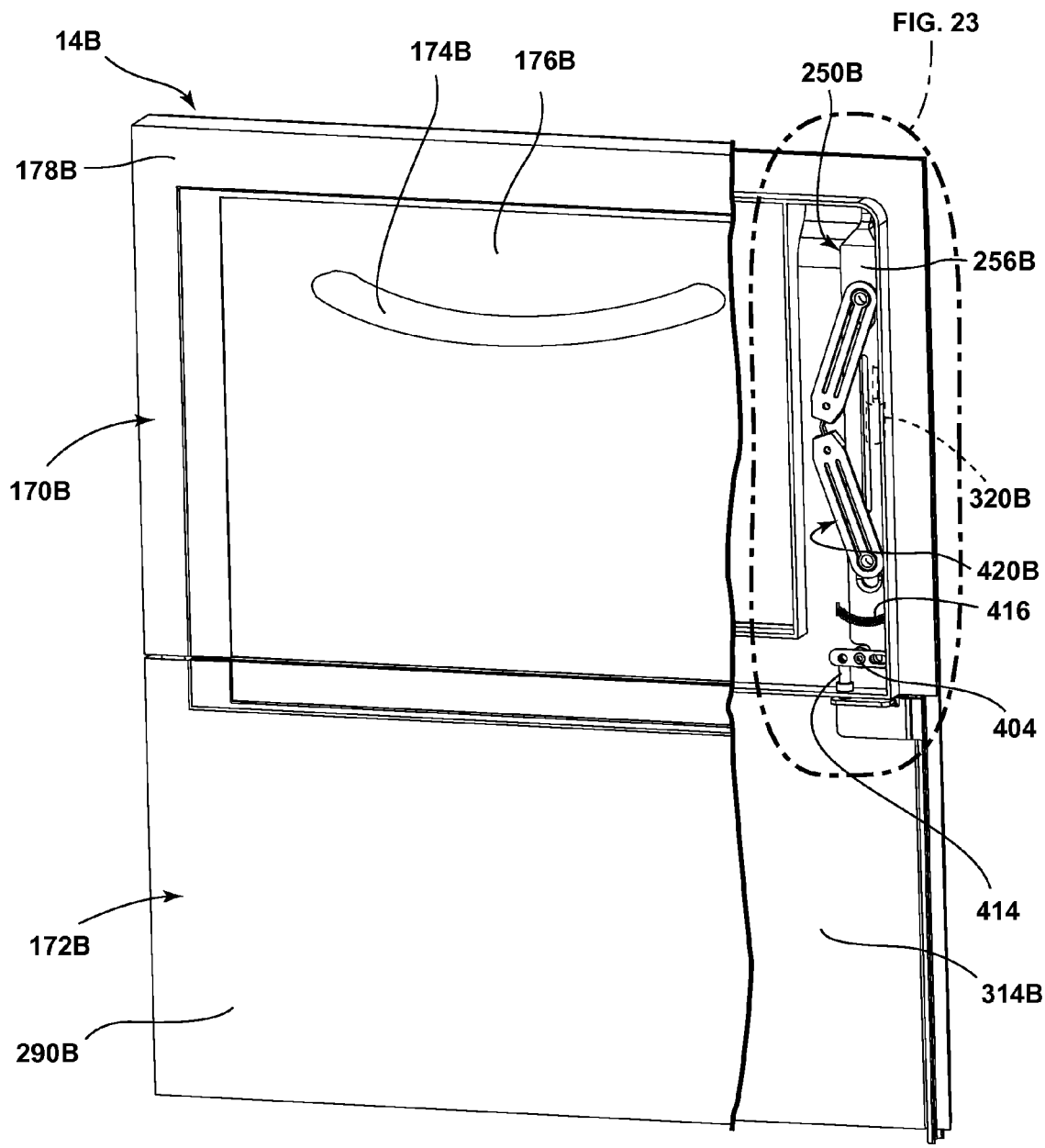
FIG. 22 is a perspective view of a dishwasher door according to another embodiment having an upper door and a lower door, with a portion of the door broken away to show a transformation assembly.

FIG. 22 illustrates another alternative embodiment for the door 14B of the dishwasher; this embodiment is similar to the door 14 from the embodiment of FIGS. 1-16 with the primary differences relating to an alternative actuator assembly 320B located in the upper door 170B rather than the lower door 172B and an alternative transformation assembly 250B in the upper door 170B actuated by the actuator assembly 320B. Elements similar to those in previous embodiments described above are identified with the same reference numeral bearing the letter "B." The following text describes one of the transformation assemblies 250B and one of the corresponding actuator assemblies 320B with it being understood that a duplicate set or sets of the transformation assembly 250B and the actuator assembly 320B may be located on the opposite side of the door 14B or other locations on the door 14B if desired.

Figure 23:
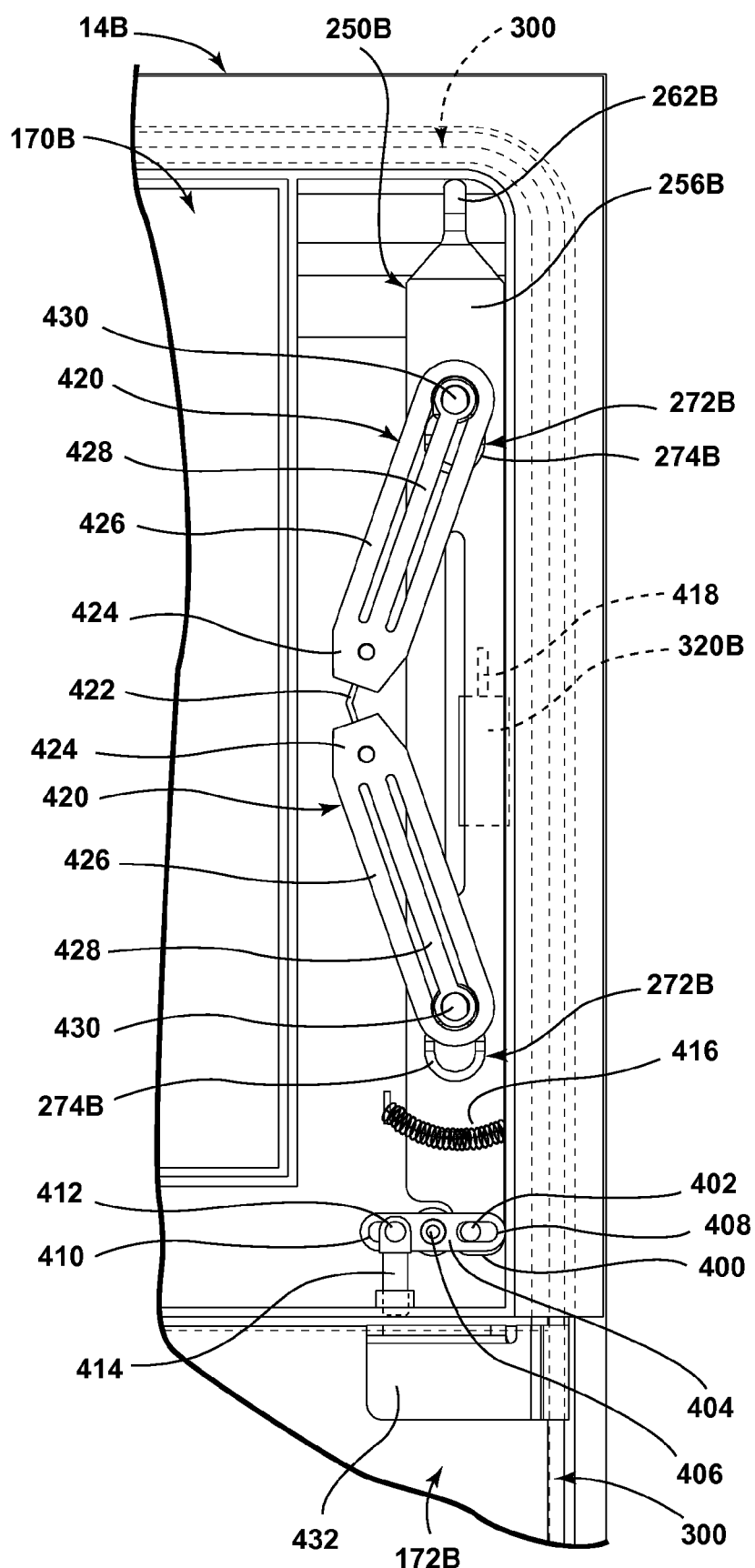
FIG. 23 is an enlarged view of a portion of the door of FIG. 22 with the transformation assembly positioned to place the door in a drawer mode.
Figure 26:
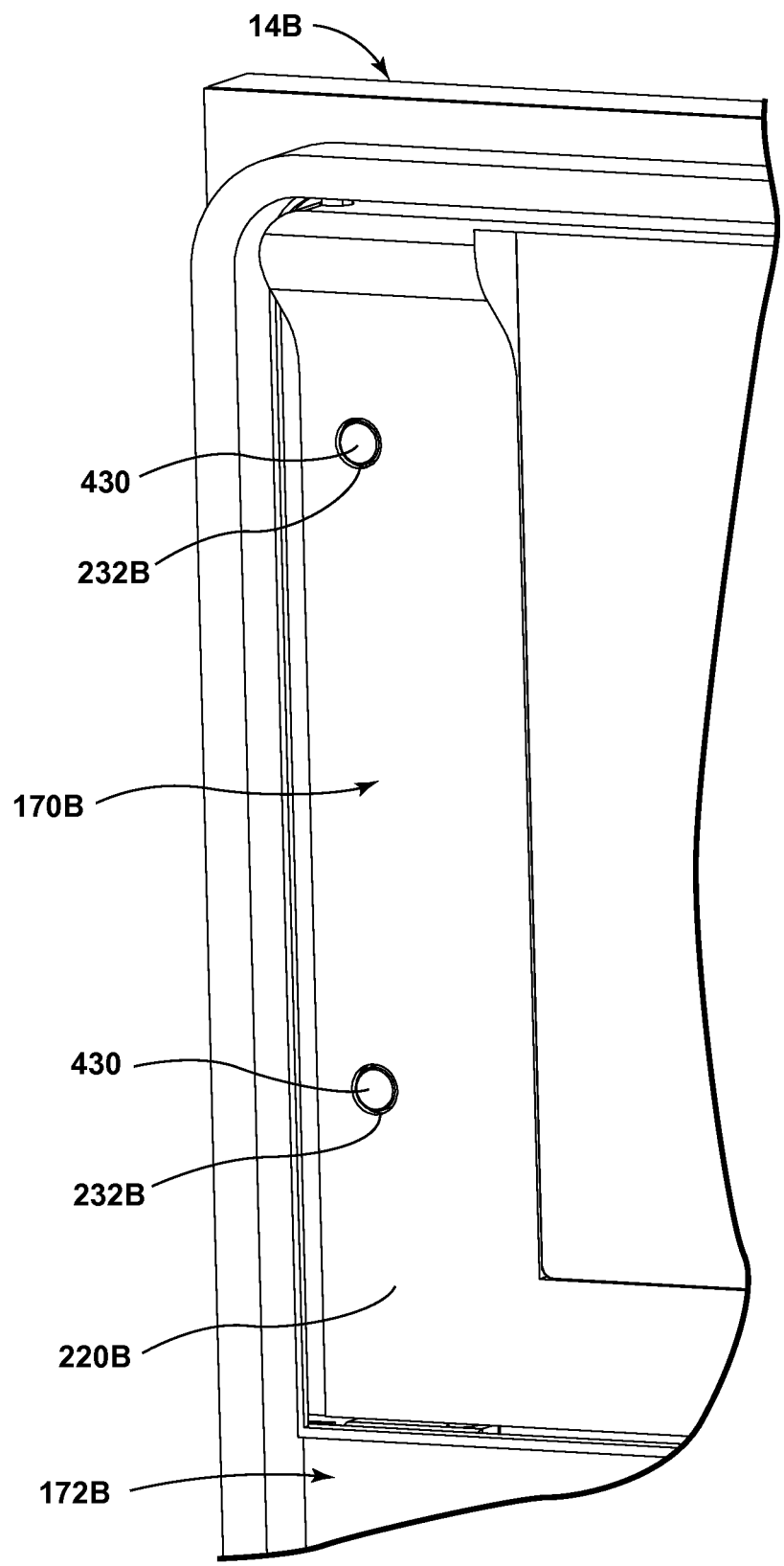
FIG. 26 is a rear view of a portion of the door of FIG. 22.

Referring now to FIG. 23, which is an enlarged view of the region identified in FIG. 22, the transformation assembly 250B includes a locking member 256B in the form of a generally vertically oriented arm terminating at its upper end at an upwardly extending locking finger 262B and at its lower end at a finger 400 with a transverse pin 402. A link 404 mounted to the upper door 170B for pivoting movement at a pivot pin 406 includes at one end a first slot 408 that receives the pin 402 on the locking member 256B and at an opposite end a second slot 410 that receives a pin 412 of a plunger 414 extending downwardly from the link 404. The locking member 256B further includes a pair of vertically aligned key slots 272B having a circular portion 274B and an upwardly extending linear portion 276B (FIG. 24) with a width smaller than the diameter of the circular portion 274B. As with the previous embodiment, the key slots 272B align with corresponding apertures 232B in the upper door rear panel 220B (FIG. 26)

such that either the circular portion 274B or the linear portion 276B aligns with the corresponding apertures 232B when the locking member 256B slides within the upper door 170B, as will be described in further detail below.

Figure 24:
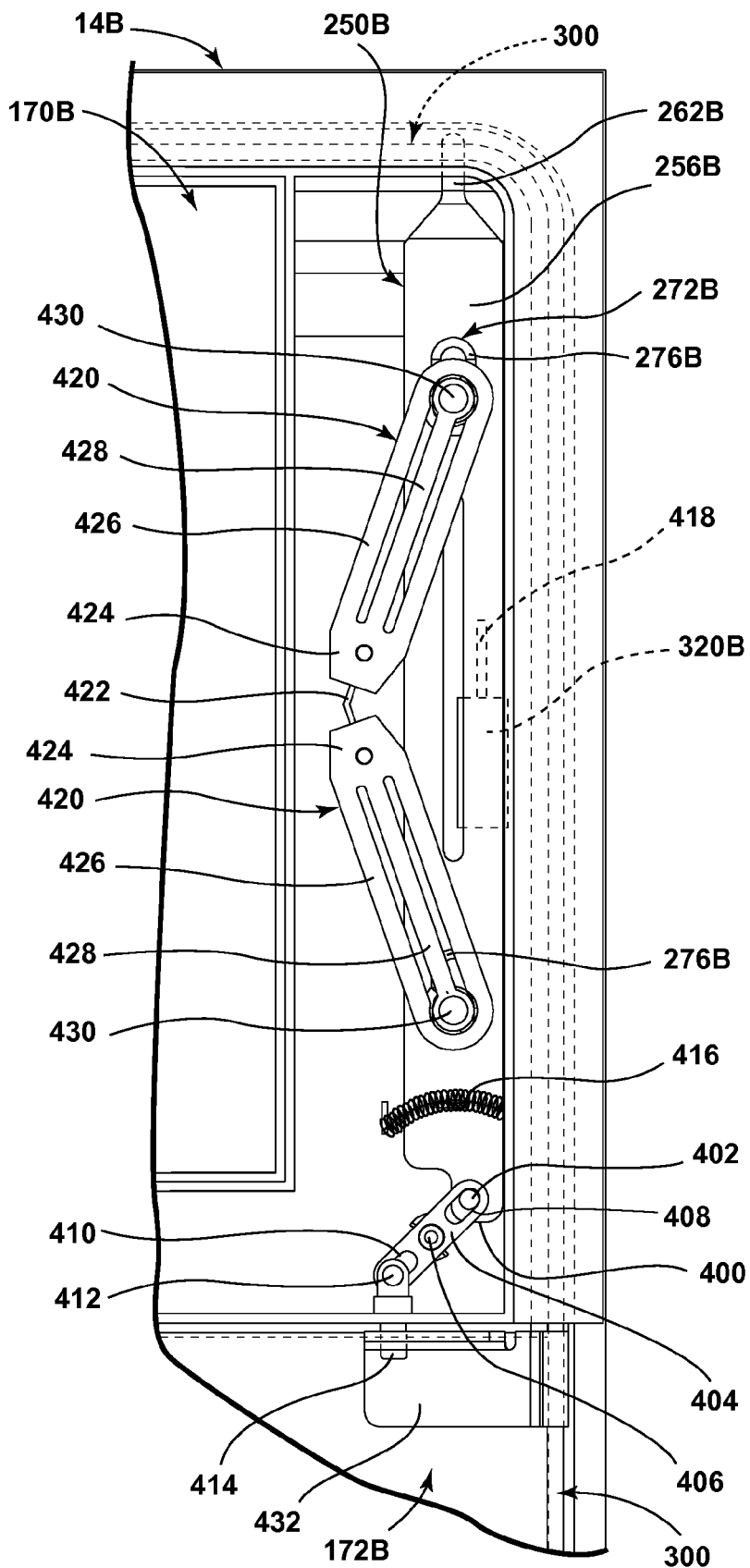
FIG. 24 is an enlarged view similar to FIG. 23 with the transformation assembly positioned to place the door in a door mode.

The locking member 256B is biased to a down position, illustrated in FIG. 23, or an up position, depicted in FIG. 24, by a biasing member 416 shown by example in the form of a compression spring. The biasing member 416 may be any type of part or device that retains the locking member 256B in the down and/or up positions, such as a leaf spring. In the present embodiment, the biasing member 416 may be mounted at its ends to the upper door 170B, such that its ends are in a fixed position, and coupled to the locking member 256B at some point between the ends of the biasing member 416 for vertical movement of the central portion of the biasing member 416 with the locking member 256B.

The actuator assembly 320B in the present embodiment is located in the upper door 170B, as mentioned above, and operatively coupled to the locking member 256B. In particular, the actuator assembly 320B may be a linear solenoid having a rod 418 coupled to the locking member 256B for cooperative movement of the locking member 256B and the rod 418. Downward movement of the rod 418 pulls the locking member 256B toward the down position of FIG. 23, while upward movement of the rod 418 pushes the locking member 256B upward toward the up position of FIG. 24.

The actuator assembly 320B can be any suitable type of actuator, examples of which are provided above with respect to the embodiment of FIGS. 1-16, such as a mechanical actuator, such as a mechanical linkage assembly with a lead screw and motor, a pneumatic actuator, or a hydraulic actuator. Furthermore, the actuator assembly 320B can be located at any suitable position within the door 14 that can accommodate the size of the actuator assembly 320B. In the embodiment of FIGS. 23 and 24, exemplary alternative positions for the actuator assembly 320B include, but are not limited to, at the upper end of the upper door 170B and at the lower end of the upper door 172B. When the actuator assembly 320B is located at either of these alternative positions, the rod 418 or other movable part of the actuator assembly 320B that induces movement of the transformation assembly 250B may be coupled to the transformation assembly 250B, such as to the locking member 256B, by a coupling mechanism that transfers movement of actuator assembly 320B to the transformation assembly 250B. In one embodiment, the rod 418 may be coupled to the locking bar 256B by a resilient link or arm, such as a spring steel link.

Figure 25A:
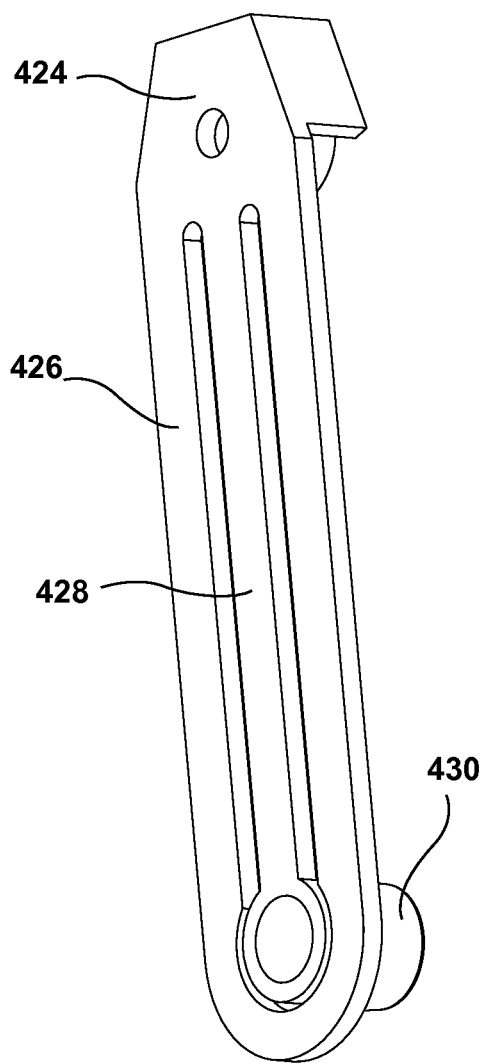
FIG. 25A is a front perspective view of a closure element from the transformation assembly of FIG. 22.
Figure 25B:
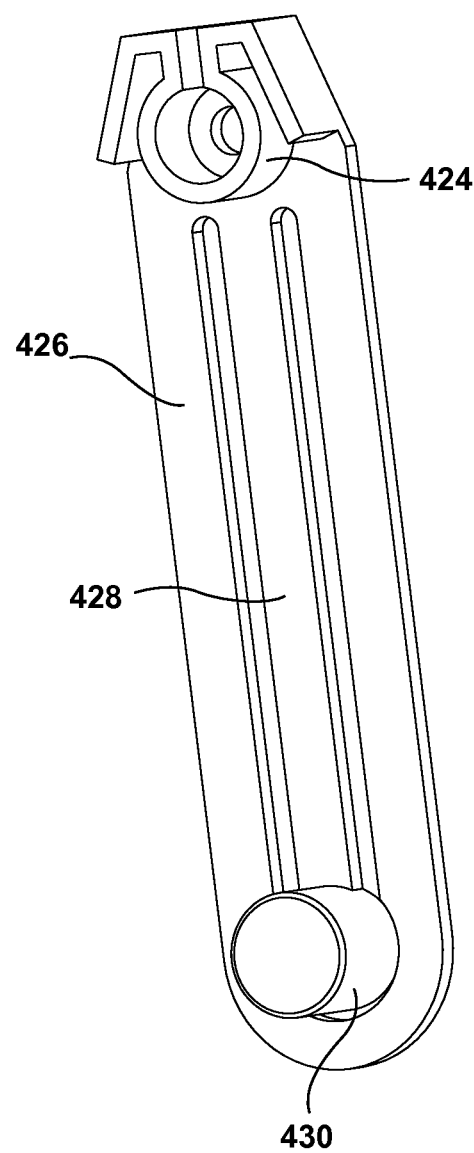
FIG. 25B is a rear perspective view of the closure element from the transformation assembly of FIG. 22.

The transformation assembly 250B may optionally include a pair of closure elements 420 mounted to the upper door 170B at a closure element support 422 and operatively coupled to the locking member 256B for cooperation with the key slots 272B of the locking member 256B. Shown in enlarged perspective views in FIGS. 25A and 25B, each closure element 420 has a mounting fixture 424 at one end for mounting the closure element 420 to the closure element support 422 and a generally U-shaped peripheral body 426 extending from the mounting fixture 424 and forming an elongated internal space. An elongated spring arm 428 extends from near the mounting fixture 424 and along the internal space formed by the peripheral body 426 and terminates at a plug 430 projecting in a direction transverse to the longitudinal axis of the spring arm 428. The spring arm 428 is configured such that the plug 430 is biased into the corresponding key slot 272B, as shown in FIGS. 23 and 24, and into the corresponding apertures 232B on the rear panel 220B of the upper door 170B, as shown in FIG. 26 and described in more detail below.

The operation of the door 14B of FIGS. 22-26 for conversion between the drawer mode (i.e., partial door mode) and the door mode (i.e., the full door mode) is generally similar to that of the embodiment of FIGS. 1-16 in that the transformation assembly 250B couples the upper door 170B to the drawer 40 with the utensil rack 58 and decouples the upper door 170B from the lower door 172B in the drawer mode and, conversely, decouples the upper door 170B from the drawer 40 with the utensil rack 58 and couples the upper door 170B to the lower door 172B in the door mode. The difference in the conversion operation between this and the prior embodiment relates to the actuation and operation of the transformation assembly 250B to effect the coupling and decoupling, a description of which follows.

The description of the operation begins with the door 14B initially in the drawer mode, as shown in FIG. 23, for exemplary purposes. When in the drawer mode, the locking member 256B is held in the down position by the biasing member 416, which is in a "smile" concave up configuration. In this position of the locking member 256B, the locking finger 262B at the upper end of the locking member 256B is retracted into the upper door 170B, and the finger 400 at the lower end of the locking member 256B pushes down on the link 404, which pivots about the pivot pin 406 to lift the plunger 414 into the upper door 170B, thereby decoupling the upper door 170B from the lower door 172B. Further, the mounting pins 54 on the drawer 40 (see FIG. 3) are received within the linear portion 276B of the key slots 272B to couple the upper door 170B to the drawer 40. The plugs 430 are also aligned with the liner portion 276B of the key slots 272B, but the mounting pins 54 push the plugs 430 against the bias of the spring arm 428 out of the key slots 272B and into the upper door 170B.

Conversion of the door 14B from the drawer mode to the door mode occurs when the actuator assembly 320B moves the transformation assembly 250B upward by the rod 418 extending upward to push the locking member 256B in the same direction. During the upward movement of the locking member 256B, the force exerted by the rod 418 overcomes the biasing force of the biasing member 416, which moves from the position where the biasing member 416 is concave up, through a generally horizontal center position, and to an over-center position where the biasing member 416 assumes a "frown" concave down configuration, as shown in FIG. 24, to hold the locking member 256B in the up position. The actuator assembly 320B may be in an activated condition wherein power is supplied to the actuator assembly 320B during movement of the transformation assembly 250B and subsequently in a deactivated condition wherein power is no longer supplied to the actuator assembly 320B when the transformation assembly 250B achieves the position where the biasing member 416 retains the locking member 256B in the up position. The force of the biasing member 416 not only holds the locking member 256B in the up position but also prevents the rod 418 from retracting when the actuator assembly 320B is in the deactivated condition.

When the locking member 256B is in the up position in FIG. 24, the locking finger 262B at the upper end of the locking member 256B projects through the top of the upper door 170B and into the frame 300B of the lower door 172B that surrounds the upper door 170B. Additionally, the finger 400 at the lower end of the locking member 256B pulls up on the link 404, which pivots about the pivot pin 406 to push the plunger 414 through the bottom of the upper door 170B and into a bracket 432 in the lower door 170B. The insertion of the locking finger 262B and the plunger 414 into components of the lower door 170B couples the upper door 170B to the lower door 172B. Furthermore, the upward movement of the locking member 256B decouples the upper door 170B from the drawer 40 due to movement of the key slots 272B relative to the mounting pins 54 on the drawer 40 (see FIG. 3) such that the mounting pins 54 are received within the circular portion 274B of the key slots 272B. Because the circular portion 274B of the key slots 272B is larger than the mounting pins 54, the upper door 170B can move relative to the drawer 40. When the upper door 170B pivots away from the drawer 40, the mounting pins 54 vacate the key slots 272B and the apertures 232B, and the spring arms 428 of the closure elements 420 bias the plugs 430, which are also aligned with the circular portion 274B of the key slots 272B, through the key slots 272B and into the apertures 232B. The plugs 430 effectively close the apertures 232B, thereby preventing foreign matter from entering the upper door 170B through the apertures 232B. When the upper door 170B pivots toward the drawer 40 such that the mounting pins 54 enter the apertures 232B and the key slots 272B, the mounting pins 54 push the plugs 430 into the upper door 170B against the bias of the spring arms 428.

Conversion of the door 14B from the door mode to the drawer mode is achieved by performing the above process in the opposite direction. The actuator assembly 320B moves the transformation assembly 250B downward by the rod 418 retracting downward to pull the locking member 256B in the same direction. During the downward movement of the locking member 256B, the force exerted by the rod 418 overcomes the biasing force of the biasing member 416, which moves from the position where the biasing member 416 is concave down, through the generally horizontal center position, and to the over-center position where the biasing member 416 assumes the "smile" concave up configuration, as shown in FIG. 23, to hold the locking member 256B in the down position. Again, the actuator assembly 320B may be in the activated condition wherein power is supplied to the actuator assembly 320B during movement of the transformation assembly 250B and subsequently in the deactivated condition wherein power is no longer supplied to the actuator assembly 320B when the transformation assembly 250B achieves the position where the biasing member 416 retains the locking member 256B in the down position. The force of the biasing member 256B not only holds the locking member 256B in the down position but also prevents the rod 418 from extending when the actuator assembly 320B is in the deactivated condition. The down position of the locking member 256B and the resulting decoupling of the upper door 170B from the lower door 172B and the coupling of the upper door 170B to the drawer 40 are described above.

Advantageously, locating the actuator assembly 320B in the upper door 170B and modifying the transformation assembly 250B with the biasing member 416 that holds the locking member 256B in up and down positions reduces the overall amount of power required by the actuator assembly 320B. The actuator assembly 320B requires power only during the conversion of the door 14B between the drawer and door modes and does not have to remain activated (i.e., does not require power) to maintain the door 14B in a given mode because the biasing member 416 holds the locking member 256B in position. It follows that the door 14B will remain in a given mode even if power to the actuator assembly 320B is interrupted.

Figure 27:
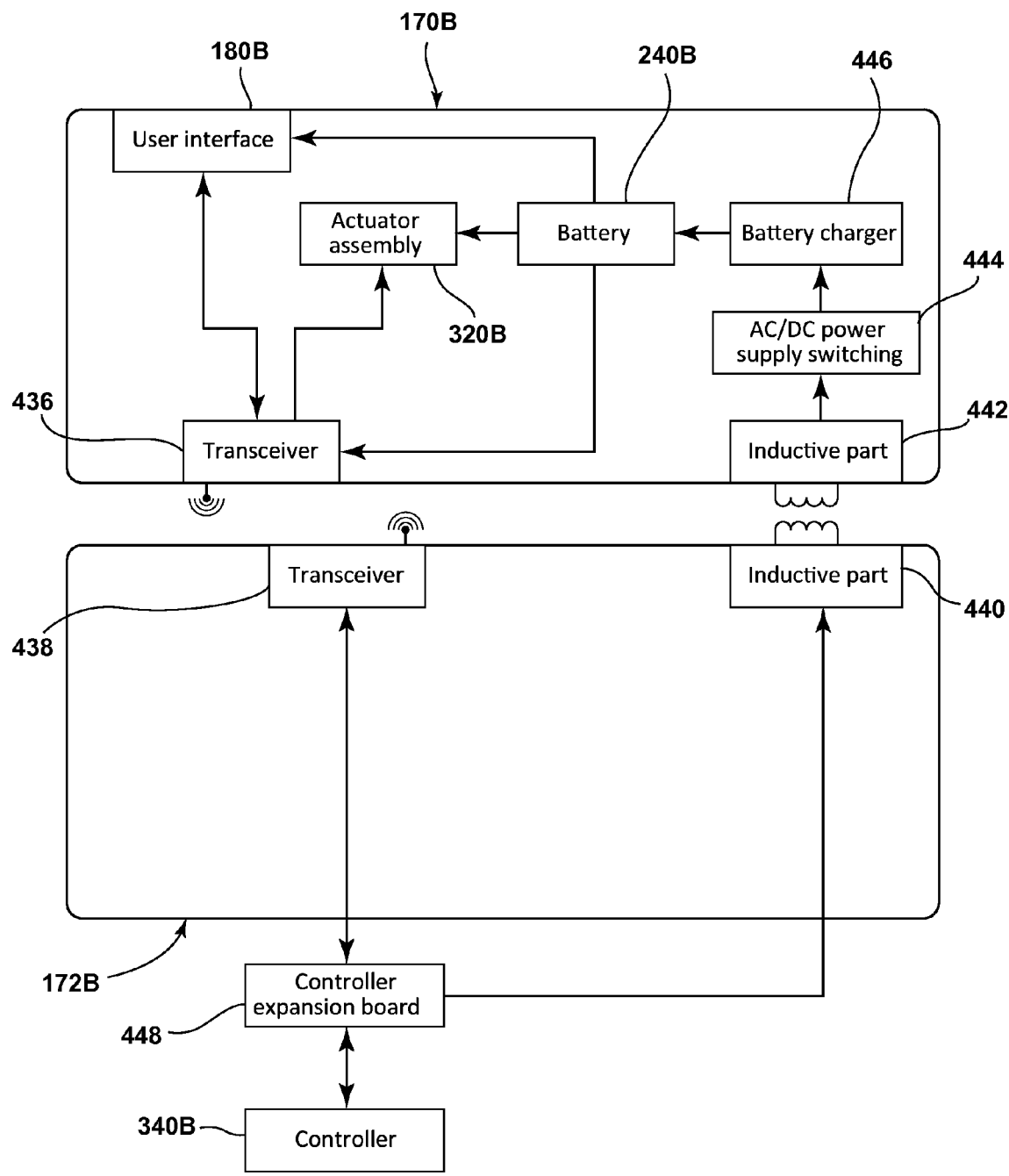
FIG. 27 is a block diagram illustrating selected electrical components housed in the upper and lower doors of the door of FIG. 22.

In order to locate the actuator assembly 320B in the upper door 170B, power must be supplied to the actuator assembly 320B. As an example, power may be provided to the actuator assembly 320B by a rechargeable power source, such as a battery 240B. FIG. 27 provides a block diagram of the door 14B with selected electrical components, including the actuator assembly 320B, located in the upper door 170B and the lower door 172B. The battery 240B may provide power to the actuator assembly 320B and to other components in the upper door 170B requiring a source of power, including, but not limited to, a user interface 180B, a data connector in the form of a transceiver 436 adapted for communication with a data connector in the form of a transceiver 438 in the lower door 172B, and an illumination source (not shown).

The battery 240B may be charged by a power charger comprising a first inductive part 440 in the lower door 172B and second inductive part 442 in the upper door 170B, which function together to form an inductive coupling when the first and second inductive parts 440, 442 are in sufficient proximity to each other, such as when the upper door 170B and the lower door 172B are in juxtaposition. The power charging may be accomplished with electromagnetic induction, electrostatic induction, or any suitable type of induction charging. Examples of juxtaposition of the upper and lower doors 170B, 172B include, but are not limited to, when the upper and lower doors 170B, 172B are coupled together for the door mode, when the upper and lower doors 170B, 172B are both in the closed position, and when the upper and lower doors 170B, 172B are coplanar, regardless of whether they are coupled to each other. In another example, the first and second inductive parts 440, 442 may be adjacent one another when the upper and lower doors 170B, 172B are in juxtaposition, regardless of the position of the upper and lower doors 170B, 172B relative to the tub 16B. When the inductive coupling forms between the first and second inductive parts 440, 442, power is transferred therebetween and may be converted to DC power at 444 before being supplied to a charger 446 for the battery 240B. The first inductive part 440 may be coupled to an external power source (not shown), such as through the hardwired main power supply to the dishwasher, and may be in communication with the controller 340B directly or indirectly, for example, through an expansion board 448 that may be located in the lower door 172B or elsewhere.

The expansion board 448 may also communicate with the transceiver 438 in the lower door 172B for data transfer with the transceiver 436 in the upper door 170B and, ultimately, the user interface 180B and the actuator assembly 320B. The data communication may optionally be designed such that the transfer of data between the transceivers 436, 438 occurs only when the upper and lower doors 170B, 172B are in juxtaposition or aligned with each other. The transceivers 436, 438 may function to transmit data in the manners as described above with respect to FIG. 17A. Other exemplary options for data transmission methods are wireless communication methods, including radio frequency, microwave, infrared (IR) communications, Wi-Fi, and wireless telecommunications.

The use of the inductive coupling formed across adjacent doors or parts of doors to charge the battery 240B or other rechargeable power source may be adapted for use in other appliances. As an example, in a refrigerator, an inductive coupling may be formed between a refrigerator door and a freezer door or between adjacent refrigerator doors configured to close the open face of the refrigerator cabinet. Each of the doors may include respective inductive parts that form the inductive coupling when the doors are in juxtaposition. Furthermore, the inductive coupling shown in FIG. 27 may be adapted for use in other embodiments of the dishwasher with the transforming door 14B, including those wherein the actuator assembly 320B is located in the lower door 172B.

Some of the embodiments described above include a detailed description of the coupling of the upper door 170 to the drawer 40, particularly the insertion of the mounting pins 54 on the drawer 40 into the apertures 232 in the upper door 170. This particular system for coupling the upper door 170 to the drawer 40 is provided for illustrative purposes only, and it is within the scope of the invention for the coupling to be accomplished with other systems or with modifications to the above described system, such as differing number, alignment, and locations of the apertures 232 and different numbers, locations, and types of the mounting pins 54.

It is also within the scope of the invention to transform the door 14 between the partial door/drawer mode and the full door/door mode with an actuator and a transformation assembly different than those described above and shown in the figures. Instead of having a linear actuator induce vertical movement of the transformation mechanism, the mode conversion may be accomplished with other kinds of actuators inducing various types of movement of other kinds of transformation assemblies. Examples of mechanical systems for coupling the upper door 170 to the lower door 172 include, but are not limited to, rotating a lever and catch system wherein rotating the lever on one of the upper and lower doors 170, 172 engages and disengages the catch on the other of the upper and lower doors 170, 172, rotating a cam finger, rotating a corner bracket, and moving a pin, such as a rack and pinion mounted pin and a laterally moving pin. The particular manner in which the transformation of the door 14 between the modes is not germane to the invention.

Further, while the illustrated embodiments show a two compartment dishwasher with a single drawer and door, with the drawer being located in an upper position, or two pivotable doors, any desired number of compartments may be used, and the arrangement of the compartments may vary. For example, if three compartments are desired, another drawer could be added. The second drawer could be located adjacent the first drawer to have two drawer compartments adjacent each other. The drawer compartments could be located at either the top or bottom of the door. Alternatively, the drawers could be spaced from each other, say one at the top and one at the bottom, with the door compartment lying between the drawer compartments. Alternatively, a single drawer could be placed in the middle of the door to form two door compartments, separated by a drawer compartment. In another embodiment, two vertically arranged drawers could be employed such that either drawer could be accessed independently with its respective door in a drawer mode, or both could be accessed simultaneously with the door in a full door mode. In this case, the door could be configured with separate openings in a frame through which the independent drawers may move when in drawer mode, or the door could be designed without a surrounding frame such that the drawers span the entire width of the dishwasher. Any conceivable combination and arrangements of drawer and door compartments could be used.

In the above description, the mode of the door 14 is referred to as the drawer/partial door mode and the door/full door mode. These terms are meant to differentiate the modes from each other and are not intended to be limiting. In the drawer/partial door mode, at least one part (hence, "partial") of the door can move independently of at least one other part of the door, regardless of the total number of parts that form the door. The independently movable part of the door can optionally function as part of a drawer, as in the embodiments of FIGS. 1-16 and 22-26, or can function in another manner, such as a pivoting door, as in the embodiment of FIGS. 18-23 or in any other suitable manner. In the door/full door mode, at least two of the parts of the door are coupled together for cooperative movement, regardless of the total number of parts that form the door. The term "full" does not require that all parts that form the door are coupled together, unless the door comprises only two parts.

While the invention has been specifically described in connection with certain specific embodiments thereof, it is to be understood that this is by way of illustration and not of limitation, and the scope of the appended claims should be construed as broadly as the prior art will permit.

What is claimed is:

1. A dishwasher configured to execute at least one automatic cycle of operation for treating utensils, the dishwasher comprising:
a tub with an open face for receiving utensils for treatment and at least partially defining an upper treating chamber and a lower treating chamber, wherein the upper treating chamber and the lower treating chamber are separated by a partition;
a utensil rack slidably coupled to the tub;
a door movable between opened and closed conditions to selectively close the open face and having a first part hingedly mounted to the dishwasher for pivotal movement relative to the open face and a second part selectively coupled to one of the first part and the utensil rack;
a user interface non-removably mounted to the door;
a rechargeable power supply operably coupled to the user interface;
a power charger remote from the door selectively providing power to the rechargeable power supply; and
wherein the door is operable in one of a door mode, where the second part is connected to the first part and the second part pivotally moves with the first part to selectively open and close the open face, and a drawer mode, where the second part is coupled to the utensil rack and second part can be pulled or pushed to slidably move the utensil rack.

2. The dishwasher of claim 1, further comprising a non-wired connection coupling the power charger to the rechargeable power supply.

3. The dishwasher of claim 2 wherein the rechargeable power supply is removably mounted to the door and configured to be operably coupled to the power charger when remote from the door to receive power from the power charger.

4. The dishwasher of claim 3 wherein the non-wired connection comprises an electromagnetic radiation transmitter coupled to the power charger and an electromagnetic radiation receiver coupled to the rechargeable power supply, wherein power from the power charger may be transmitted to the rechargeable power supply by electromagnetic radiation.

5. The dishwasher of claim 3 wherein the non-wired connection comprises a magnetic field generator coupled to the power charger and a magnetic field receiver coupled to the rechargeable power supply.

6. The dishwasher of claim 1, further comprising a wired connection selectively coupling the rechargeable power supply to the power charger.

7. The dishwasher of claim 6 wherein the wired connection comprises a wired port on the door, and the power charger comprises a wired connector receivable within the wired port.

8. The dishwasher of claim 1 wherein the door further comprises a drawer.

9. The dishwasher of claim 1, further comprising a controller operably coupled to the user interface, wherein the user interface is provided with the second part of the door, and the controller is not provided with the second part of the door.

10. The dishwasher of claim 9 wherein the controller is provided with the first part of the door.

11. The dishwasher of claim 9 wherein the controller is not provided with the first part of the door.

12. The dishwasher of claim 1 wherein the rechargeable power supply comprises at least one battery.

* * * * *